(12) United States Patent
Mandiganal et al.

(10) Patent No.: US 10,986,575 B2
(45) Date of Patent: *Apr. 20, 2021

(54) SYSTEM FOR COMMUNICATION WITH DEVICES ON A NETWORK TO MINIMIZE POWER CONSUMPTION

(71) Applicant: Ademco Inc., Golden Valley, MN (US)

(72) Inventors: Santosh Mallikarjuna Mandiganal, Hubli (IN); Robert D. Juntunen, Minnetonka, MN (US); Soumitri Kolavennu, Blaine, MN (US); Gabriel A. Bergman, New Brighton, MN (US)

(73) Assignee: Ademco Inc., Golden Valley, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/781,634

(22) Filed: Feb. 4, 2020

(65) Prior Publication Data

US 2020/0178173 A1 Jun. 4, 2020

Related U.S. Application Data

(63) Continuation of application No. 15/557,782, filed as application No. PCT/US2016/022218 on Mar. 11, 2016, now Pat. No. 10,582,450.

(Continued)

(51) Int. Cl.
*H04W 52/02* (2009.01)
*H04L 12/18* (2006.01)
(Continued)

(52) U.S. Cl.
CPC ....... *H04W 52/0216* (2013.01); *H04L 12/189* (2013.01); *H04L 12/2803* (2013.01); *H04W 88/08* (2013.01); *Y02D 30/70* (2020.08)

(58) Field of Classification Search
None
See application file for complete search history.

(56) References Cited

U.S. PATENT DOCUMENTS 8,743,765 B2   6/2014   Kakani et al.
8,755,848 B2   6/2014   Jain et al.
(Continued)

FOREIGN PATENT DOCUMENTS

CN   102577170 A   7/2012
CN   104272666 A   1/2015
(Continued)

OTHER PUBLICATIONS

Examination Report from counterpart European Application No. 16710655.8, dated Feb. 3, 2020, 4 pp.
(Continued)

*Primary Examiner* — Ayanah S George
(74) *Attorney, Agent, or Firm* — Shumaker & Sieffert, P.A.

(57) ABSTRACT

A system of controlling one or more building automation devices. The system may incorporate communicating over a first network with one or more network connected devices. An access point for the first network may be utilized to facilitate communication among the network connected devices. One or more of the network connected devices may be a low power device that has a first mode and a second mode. The low power device may expend less energy in one of the first mode and the second than in the other of the first mode and the second mode. The system may allow network devices connected to the first network to receive details about the low power device while the low power device is operating with the first mode and the second mode.

10 Claims, 14 Drawing Sheets

Related U.S. Application Data

(60) Provisional application No. 62/138,853, filed on Mar. 26, 2015, provisional application No. 62/132,437, filed on Mar. 12, 2015.

(51) Int. Cl.
  *H04L 12/28* (2006.01)
  *H04W 88/08* (2009.01)

(56) References Cited

U.S. PATENT DOCUMENTS

| | | | |
|---|---|---|---|
| 2005/0254444 | A1 | 11/2005 | Meier et al. |
| 2007/0005735 | A1* | 1/2007 | Chen .................... H04L 12/281 709/220 |
| 2007/0192437 | A1 | 8/2007 | Wang et al. |
| 2007/0198443 | A1* | 8/2007 | Chernev ................ G06Q 30/02 705/500 |
| 2007/0290924 | A1* | 12/2007 | McCoy .................... G01S 5/14 342/464 |
| 2012/0170579 | A1 | 7/2012 | Yim et al. |
| 2013/0185572 | A1* | 7/2013 | Yang .................... G06F 1/3278 713/320 |
| 2013/0286922 | A1 | 10/2013 | Nambiar |
| 2013/0336319 | A1 | 12/2013 | Liu et al. |
| 2015/0347542 | A1 | 12/2015 | Sullivan et al. |
| 2018/0077642 | A1 | 3/2018 | Mandiganal et al. |

FOREIGN PATENT DOCUMENTS

| | | | |
|---|---|---|---|
| EP | 1571760 A2 * | 9/2005 | ........ H04W 52/0229 |
| EP | 1571760 A2 | 9/2005 | |
| EP | 2157739 A1 | 2/2010 | |
| WO | 2016145418 A1 | 9/2016 | |

OTHER PUBLICATIONS

First Office Action from counterpart Chinese Application No. 201680027189.0, dated Feb. 3, 2020, 22 pp. (includes translation).
The International Preliminary Report and Written Opinion for PCT Application No. PCT/US20161022218, report dated Sep. 12, 2017.
Knoll "5 Great Battery Saving Apps to Extend Your Android Phone's Life," downloaded from http://trendblog.net/5-great-battery-saving-apps-for-android-phones-to-extend-your-android-phone-life/, Sep. 2, 2013, printed Mar. 18, 2015.
Examination Report from counterpart European Application No. 16710655.8, dated Feb. 21, 2019, 6 pp.
Apple Inc, "Bonjour Operations", accessed from https://developer.apple.com/library/archive/documentation/Cocoa/Conceptual/NetServices/Articles/NetServicesArchitecture.html#/apple_ref/doc/uid/20001074-SW1, updated on Apr. 23, 2013, 7 pp.
Prosecution History from U.S. Appl. No. 15/557,782, dated Feb. 8, 2018 through Oct. 25, 2019, 91 pp.
Chinese Office Action from Application Serial No. 201680027189.0 dated Sep. 24, 2020 (19 pp) (translation included).
Response filed on Jun. 15, 2020 to Examination Report from counterpart European Application No. 16710655.8, dated Feb. 3, 2020, 13 pp.
Examination Report from counterpart European Application No. 16710655.8, dated Dec. 3, 2020, 5 pp.

* cited by examiner

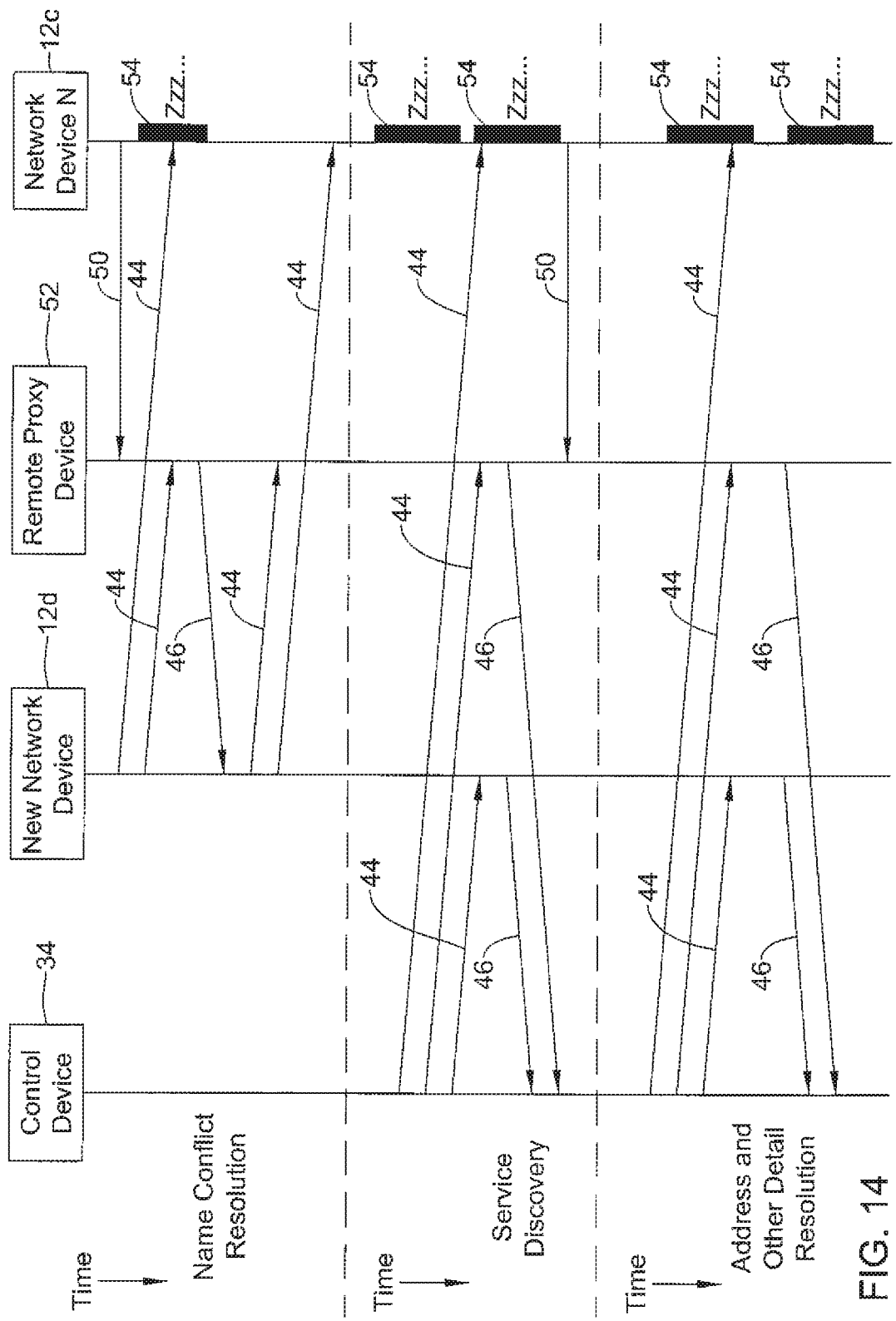

SYSTEM FOR COMMUNICATION WITH DEVICES ON A NETWORK TO MINIMIZE POWER CONSUMPTION

This application is a continuation of U.S. application Ser. No. 15/557,782, which is a U.S. National Stage filing under 35 U.S.C. 371 of International Application No. PCT/US2016/22218, filed Mar. 11, 2016, which claims the benefit of U.S. Provisional Application No. 62/132,437 filed Mar. 12, 2015 and claims the benefit of U.S. Provisional Application No. 62/138,853 filed Mar. 26, 2015. U.S. application Ser. No. 15/557,782, International Application No. PCT/US2016/22218, U.S. Provisional Application No. 62/132,437, and U.S. Provisional Application No. 62/138,853 are all hereby incorporated by reference in their entirety.

BACKGROUND

The present disclosure pertains to communicating between network connected devices and particularly communicating with a low or reduced power device connected to the network.

SUMMARY

The disclosure reveals systems for communicating over a network and between two or more network connected devices. In some cases, one or more of the network connected devices may be a low power device that is configured to switch operations between a first mode (e.g., a low power mode) and a second mode (e.g., a higher power mode relative to the low power mode). The low power device may listen for communication signals directed at it when in the second mode, but not necessarily when in the first mode. In some cases, the system may incorporate a proxy device acting as a proxy for the low power device. The proxy device may receive and identify communication signals related to the low power device and respond to those communication signals with one or more details about the low power device. The proxy may be a local proxy device (e.g., a device connected directly to the first network or other device) and/or a remote proxy device (e.g., a remote server or other device connected to the first network via a second network).

BRIEF DESCRIPTION OF THE DRAWING

FIG. 14 is a schematic flow diagram of illustrative examples of communications over a network with a low power device via a proxy.

DESCRIPTION

Figure 1:
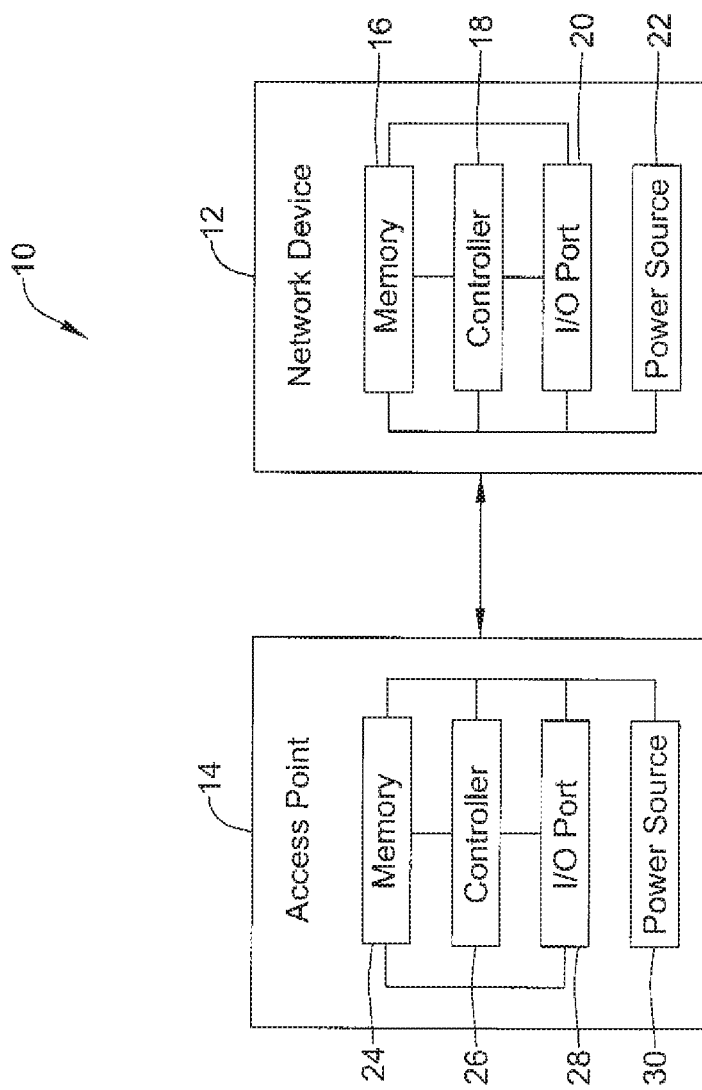
FIG. 1 is a schematic diagram of an illustrative example of network connected devices.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Standardized systems of configuration, communication, and/or control (e.g., Apple™ HomeKit or other systems via a Bonjour service or other multicast Domain Name System (mDNS) service) may enable a user to have wireless and electronic control of one's home, household features, activities, appliances, and so forth. Such systems may provide a framework for communicating with and controlling connected accessories in a user's home or other area around a user.

A framework of a standardized system may specify a set of requirements for devices to facilitate communication between the devices over a network (e.g., an internet protocol (IP) network). These requirements may require devices (e.g., controllers and/or accessories capable of being controlled by controllers) to respond to multicast and/or unicast traffic originating from a device to allow the device to discover other devices and the other devices' services, along with allowing the device to pair with and access the services of the other devices. In some cases, this may result in a device having its transceiver turned on most of the time to meet the specifications of the standardized system of configuration, communication, and/or control.

A device (e.g., an accessory and/or a controller) may need to maintain a long battery life. Maintaining a long battery life may be difficult while complying with a standardized system of configuration, communication, and/or control. In some cases, a device may utilize large rechargeable batteries, but such batteries may be expensive. The presently disclosed system may allow devices to maintain a long battery life while complying with specifications of a standardized system of configuration, communication, and/or control. In an example system, devices may be allowed to be in a sleep mode for a portion of an operating time and an awake mode for a portion of an operating time of the device to facilitate complying with requirements of a standardized system and requirements for battery life or a power stealing mechanism.

Standardized systems for configuration, communication, and/or control (e.g., HomeKit or other systems) may use a specified communication protocol (e.g., Bonjour protocol (service) or other service discovery protocols) for discovering new devices, services offered by new devices, resolving IP addresses of devices, and/or for other purposes. Additionally, or alternatively, the specified communication protocol may be used for finding unique local IP addresses (e.g., link-local addresses) and/or unique names for services and devices. In some cases (e.g., in the case of the Bonjour protocol), a specified communication protocol may achieve these functions by multicasting messages to a well-known multicast address and well-known port number (e.g., an address and/or port number of an access port (e.g., a router) or other well-known address and/or well-known port number).

While low power devices on Wi-Fi networks may make use of power-save mechanisms to sleep and still receive unicast data (e.g., data sent to a single address and/or port, such as a request for a specific device, a response to a request by a device, and so on), devices utilizing power save mechanisms may not necessarily be equipped to ensure delivery of multicast data (e.g., data sent to multiple addresses and/or ports, such as a request for addresses and/or ports of devices connected to a network, a request for devices connected to the network having a similar name to the request device, and so on). An access point of a network (e.g., a router broadcasting the network or other access point) receiving unicast data from any source destined for a sleeping device (e.g., a device in a power-save mode) may hold the data for the sleeping device until the device wakes up and polls for the data.

However, no such provisions appear available for multicast data. An access point for a network may have certain periodic times when it will transmit all multicast data received during a period. The periods may be dependent on the access point settings, specifications of standardized systems of configuration, communication, and/or control, and/or requirements of a communication protocol. Example periods for sending and/or transmitting multicast data may incorporate, but are not limited to, 50 milliseconds (ms), 100 ms, 200 ms, 300 ms, 400 ms, 500 ms, 1 second, over 1 second or other time periods. Hence, if a period is 300 ms, a sleeping device that may be sleeping for more than 300 ms may completely miss a reception of the multicast data. This apparent shortcoming in the reception of multicast data may make it difficult to communicate with low-power sleeping Wi-Fi devices on a network where multicast data are transmitted at set time periods.

The system disclosed may provide several ways of solving such issues and allow low power sleeping Wi-Fi devices to take part in specified systems of configuration, communication and/or control. In one example, the system may solve the issue with one or more of several approaches by which multicast data traffic intended for a low power sleeping device is either received or acted upon appropriately by the sleeping device or other device in communication with the sleeping device.

In a first set of approaches, functionality of a low power device may be altered to ensure probes, queries, and resolutions of other devices using a communication protocol and/or a standardized system of configuration, communication and/or control may be responded to. A communication protocol (e.g., a Bonjour protocol) may be a multicast mechanism and hence any service discovered by one device can automatically be also discovered and cached by all other devices in the multicast group. Some approaches that one may use in the first set of approaches may incorporate a gratuitous periodic query response approach and a periodic query request and response on wake up approach.

With gratuitous periodic query response approaches, a low power device may provide other devices advance notification of its details. That is, a low power device may update cache (e.g., communication protocol (e.g., Bonjour protocol)/MDNS cache or other cache) of other devices before those other devices ask for the update and/or before the low power device knows the other devices asked for the update. In one example, the updates may be communication protocol publication and discovery packets originating from the low power device after every wakeup from sleep or a different set period. Thus, this may help a control device or other device to discover the sleeping device and/or update the sleeping device's state.

In the gratuitous response approach, a low power device may register with an MDNS responder (e.g., access point) and announce its services automatically for a first time and in order to implement periodic sleep and wakeup cycles; the low power device may initiate an automatic update of the MDNS cache in control devices by sending an unsolicited query and a response to the query from the low power device on every wakeup using low level "update service" APIs or other mechanisms. This may ensure that the gratuitous response can help with a service discovery for control devices and other devices entering the network, name and IP address collision resolution on a standardized system configuration, communication, and control (e.g., HomeKit) and/or a communication protocol (e.g., Bonjour) for devices in the network, and provide a resolution of the SRV, TXT and other record types by control devices. This behavior on the low power device may be continued in both paired and unpaired states of the communication protocol. This approach may also involve optional gratuitous ARP queries to resolve an ARP request from a control device (e.g., phone, laptop, tablet computer, personal computer, other controller, and so forth).

The second approach (Periodic Query request and response on wake up) may be a variation on the first approach. In addition to the query responses, actual query requests may be sent out from low power devices on the network upon every wakeup from sleep. The low power device may send out an MDNS query for its matching service type and may also initiate a response to this query with its services before entering into a sleep mode. This approach may follow the standard MDNS query request/response behavior instead of implementing the unsolicited query response behavior mentioned above. This may ensure communication protocol conformance (e.g., some communication protocols may not allow response without a query requesting a response). Such behavior on the low power device may be continued in both paired and unpaired states of the communication protocol (e.g., HomeKit accessory protocol). This approach may also involve optional gratuitous ARP queries to resolve an ARP request from a control device (e.g., phone, laptop, tablet computer, personal computer, and so on).

Additional approaches may be aimed at changing the functionality of both controllers (e.g., phones, laptop computers, tablet computers, and so forth) and low power devices (e.g., battery operated computing devices, computing devices with power stealing mechanisms, and/or other low power devices, which may incorporate, but are not limited to, thermostats, building automation sensors, HVAC controllers, cameras, video cameras, and/or other building automation devices). In these approaches, an operation of the control devices (e.g., communication protocol compliant devices) may change in addition to changing an operation of the low power devices. These approaches may incorporate cached information about a service (e.g., a service of a low power device or other service) that utilizes a local proxy for a lower power device, and/or utilizes a wide area proxy for a low power device.

In a cached information about a service approach, a control device or other device connected to a network may be asked and/or required to cache and remember details (e.g., information about an IP address, a port number, a device name, and/or a service name) of low power devices over long periods of time (e.g., periods of time including disconnecting and/or re-connecting to the network). Such details of the lower power devices may be cached against a network ID and/or password hash of the network, and thus when the controller or other device goes out and comes back into the network, the controller or other device does not necessarily have to re-discover the services of the low power device by multicasting queries to the network. In some cases, the control device may send out unicast queries with update requests to low power devices having details stored in the cache of the control devices.

In the cached information about a service approach, the low power device may implement a read only service characteristic to indicate that it is a low power device. The low power device may initially register with an access point (e.g., an MDNS responder) and announce its services automatically for the first time and follow one or more of the Gratuitous response approach and the Periodic Query request and response approach proposed to periodically report services. But once the low power device gets paired or successfully performs a pair verify with the control device, the control device may keep a cache of the services of the low power device and check for the service characteristic updates using unicast query requests only. Any new control device added to the network may learn about this service characteristic of the low power device and initiate a periodic unicast request for low power device state. The low power device, upon pair removal, may go back to the initial state and follow any of the first two approaches to advertise its services for the controllers on the local network until the low power device performs a pairing or successful pair verify with the control device. This approach may implement gratuitous ARP queries to resolve an ARP request from a control device (e.g., phone, laptop, tablet computer, personal computer, and so on) and also to help detect IP conflicts or change in IP addresses and assist in updating the ARP tables of the control devices on the network.

This approach may make the accessory device less chatty compared to the first two approaches, reducing a number of transmissions and improving battery life. A periodic return to the chatty behavior as described in approach one may be needed.

In the proxy-based (e.g., local proxy and/or wide area proxy) approaches, a third device may be used as a proxy for one or more low power sleeping devices. In one example, the proxy device may reply to multicast queries on behalf of the low power devices for which it is a proxy. The low power device in turn may keep the multicast data at the proxy up-to-date with its service details by updating the information periodically and upon change.

The low power device and the proxy may communicate over any network, which may or may not be the network to which other network connected devices are connected. In one example, the low power device and the proxy may communicate over Bluetooth™, Bluetooth™ Low Energy (BLE), near-field communication (NFC), Wi-Fi, and/or one or more other proprietary or non-proprietary communication protocols.

If the proxy is in the same local network as the low power devices, it may be considered a local area proxy. If the proxy is a server on the cloud with a well-known IP address and port number, the proxy may be a wide area proxy.

In the local multicast proxy approach, the low power device may initially work in a chatty manner when it first joins the network. However, when a proxy device is discovered by the low power device, the low power device may register for the proxy service with the proxy device. From that point, virtually all multicast queries for specific services in the low power device or generic "any" queries may be answered by the proxy device on behalf of the low power device. The low power device may have the responsibility to keep the proxy device up-to-date with the current conditions and state of the low power device.

In the wide area multicast proxy approach, the low power device may initially register for the proxy service with a proxy capable cloud server having a well-known IP address (e.g., similar to wide area Bonjour). Control devices may send queries to the cloud server in addition to multicasting on the local network. The cloud server may match the ISP provided IP address where the query is coming from with the ISP provided IP address used to register the service by the low power device and return all the relevant information in a query response to the controller. This approach may be useful if there is an internet connection. If there is not internet connection, the low power device may have to revert back to chatty behavior.

A further approach may depend on the power consumption models for the low power device. In this approach, a control device may ensure that virtually all queries are repeated often in a set period. The period may be equal to the sleep interval of the low power device. Thus, it may be ensured that each query is heard by the low power device.

In operation, a device may communicate over Wi-Fi/Ethernet or other communication system (e.g., Bluetooth™, Bluetooth™ Low Energy, and so forth). During normal operation, such a device may implement protocol specific standard sleep mechanisms. A Wi-Fi supported device may configure a listen interval duration and may use any standard IEEE power save mechanisms (Power save poll, power save without poll, WMM power save, and so on) to enter into a sleep mode. The device may then stay awake for a minimum timeout interval to perform its own TCP/IP transactions and respond to other possible unicast queries originated from controllers before entering to sleep again.

Turning to the figures, FIG. 1 depicts a network 10 with a network connected device (e.g., a network device 12) in communication with an access point 14. The network 10 may be a local area network (LAN) and/or other network type (e.g., a wide area network (WAN) or a network that may be part of a WAN). The network device 12 may be in communication with the access point 14 over Wi-Fi or Ethernet. Alternatively or in addition, the network device 12 may be in communication with the access point 14 over one or more other communication systems including, but not limited to, ZIGBEE, Bluetooth™, Bluetooth™ Low Energy, Near Field Communication (NFC), radio frequency, and so on.

The network device 12 may incorporate a memory 16, a controller 18, an input/output (I/O) port 20, power source 22, and/or other components, where the components of the network device 12 may communicate with one another. A network device 12 may be any type of device configured to connect to the network. In one example, the network device 12 may be a building automation device (e.g., a thermostat, a camera, a video camera, a carbon monoxide detector, a smoke detector, one or more sensors, a light bulb, an HVAC controller, and so forth) and/or a different device.

The access point 14 may incorporate a memory 24, a controller 26, an I/O port 28, and a power source 30, where the components of the access point 14 may communicate with one another. The access point 14 may be any type of device configured to facilitate providing access to the network 10. In one example, the access point 14 may be a router and/or other access point.

Figure 2:
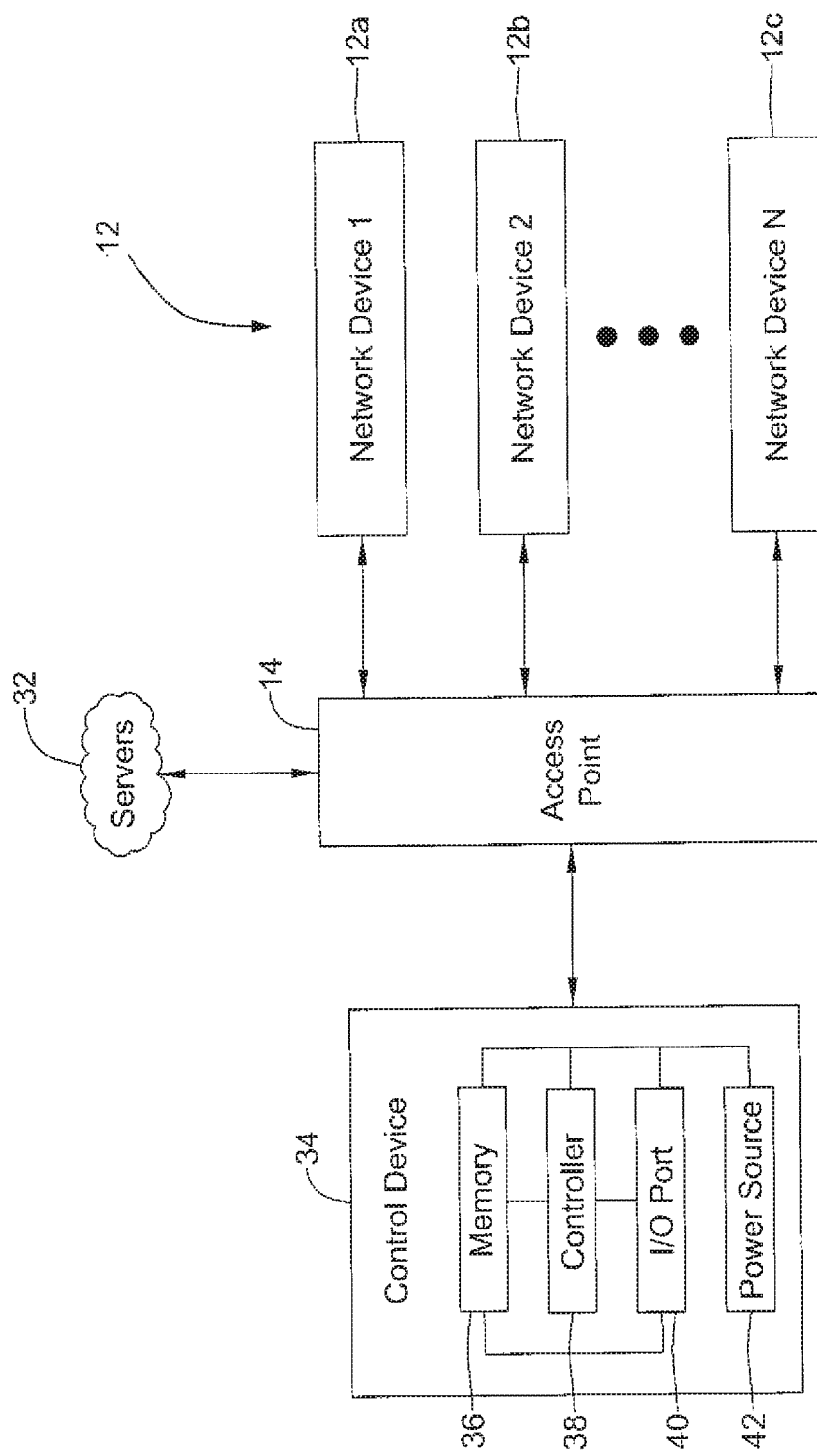
FIG. 2 is a schematic diagram of a further illustrative example system of network connected devices.

FIG. 2 depicts a network (e.g., network 10) that may incorporate one or more devices connected to the access point 14. In one example, the access point 14 may be in communication with one or more network devices 12 (e.g., network device 1 12a, network device 2 12b, . . . network device N 12c), one or more servers 32, and one or more control devices 34. The network devices 12 in communication with the access point 14 may communicate with one another and/or other devices separate from and/or through the access point 14.

The one or more servers 32 may be located local to the access point 14 or remote from the access point 14 and may be connected to the access point 14 over a LAN or a WAN. Although not shown, the server may be a computing device having memory, a controller, an I/O port, a power source, and/or other components, where components of the server 32 may communicate with one another. Illustratively, the server may communicate with one or more access points 14 at one or more different or similar geographical locations.

In one example, the server 32 may be a server of a manufacturer of a network device 12. In such an example, the manufacturer may be a manufacturer of a building automation device and the server 32 may incorporate account information for an owner of the building automation device and/or device information for the specific building automation device (e.g., media access control (MAC) address, IP address, port number, device name on a network, and so on).

The control device 34 may be in communication with the access point 14 over Wi-Fi or Ethernet. Alternatively or in addition, the control device 34 may be in communication with the access point 14 over one or more other communication systems including, but not limited to, ZIGBEE, Bluetooth™, Bluetooth™ Low Energy, Near Field Communication (NFC), radio frequency, and so on.

The control device 34 may incorporate a memory 36, a controller 38, an input/output (I/O) port 40, a power source 42, and/or one or more other components, where the components of the control device 34 may communicate with one another. A control device 34 may be any type of device configured to connect to the network. In one example, the control device 34 may be a smart phone, a tablet computer, a personal computer, a laptop and/or a different device. Although only a single control device 34 is depicted connected to the access point 14, one or more additional and/or alternative control devices 34 may be in communication with the access point 14, each other, and/or other devices separate from and/or through the access point 14.

As discussed above, the computing devices discussed herein (e.g., network device 12, access point 14, server 32, control device 34, and so forth) may be configured to connect to and communicate with one another over one or more networks. Such computing devices may incorporate a memory, one or more controllers, one or more I/O ports, and one or more power sources. Additionally or alternatively, the computing devices disclosed herein may incorporate one or more other components.

The network 10 may incorporate one or more networks and may incorporate one or more types of networks. Illustratively, the network 10 may incorporate a local area network (LAN), a wide area network (WAN), and/or one or more other networks connecting two or more computing devices. Although numerous networks may be disclosed as connecting two or more computing devices, these networks 10 may be a single network or several networks.

The controllers of the computing devices may incorporate one or more processors. The controllers may be or incorporate one or more micro-controllers and/or one or more micro-processors. The controllers and/or processors thereof may be in communication with memory of the computing devices or other memory and may be configured to execute executable instructions stored on the memory and/or store and use data saved on the memory. In one example, the memory of the computing device may incorporate one or more control system algorithms and/or other algorithms and the controller may execute instructions (e.g., software code or other instructions) related to the algorithms in the memory.

The memory of the computing devices may incorporate one or more pieces of memory, one or more types of memory, and/or any combination of types of memory. For example, the memory may be volatile memory, non-volatile memory (e.g., FLASH or other non-volatile memory), random access memory (RAM), read-only memory (ROM), removable memory (e.g., a USB drive or other removable drive) and/or one or more other types of memory. In some cases, the memory may be configured to store data and/or instructions for execution by the controllers (e.g., one or more processors of the controllers) of the computing devices.

The I/O ports of the computing devices may send and/or receive information and/or control signals to and/or from other computing devices on the network 10. The I/O ports may be any type of communication ports and may facilitate wired and/or wireless communication with the network 10 and the computing devices on the network. For example, the I/O ports may facilitate communication with the network 10 and/or other devices (e.g., network devices 12, access points 14, servers 32, control devices 34, and/or other devices) through any connection including, but not limited to, radio communication, Ethernet, cellular communication, ZigBee, REDLINK™ Bluetooth, Bluetooth Low Energy (BLE), Wi-Fi, IrDA, dedicated short range communication (DSRC), EnOcean, Near Field Communication (NFC), and/or any other suitable common (non-proprietary) or proprietary wired or wireless protocol.

Figure 3:
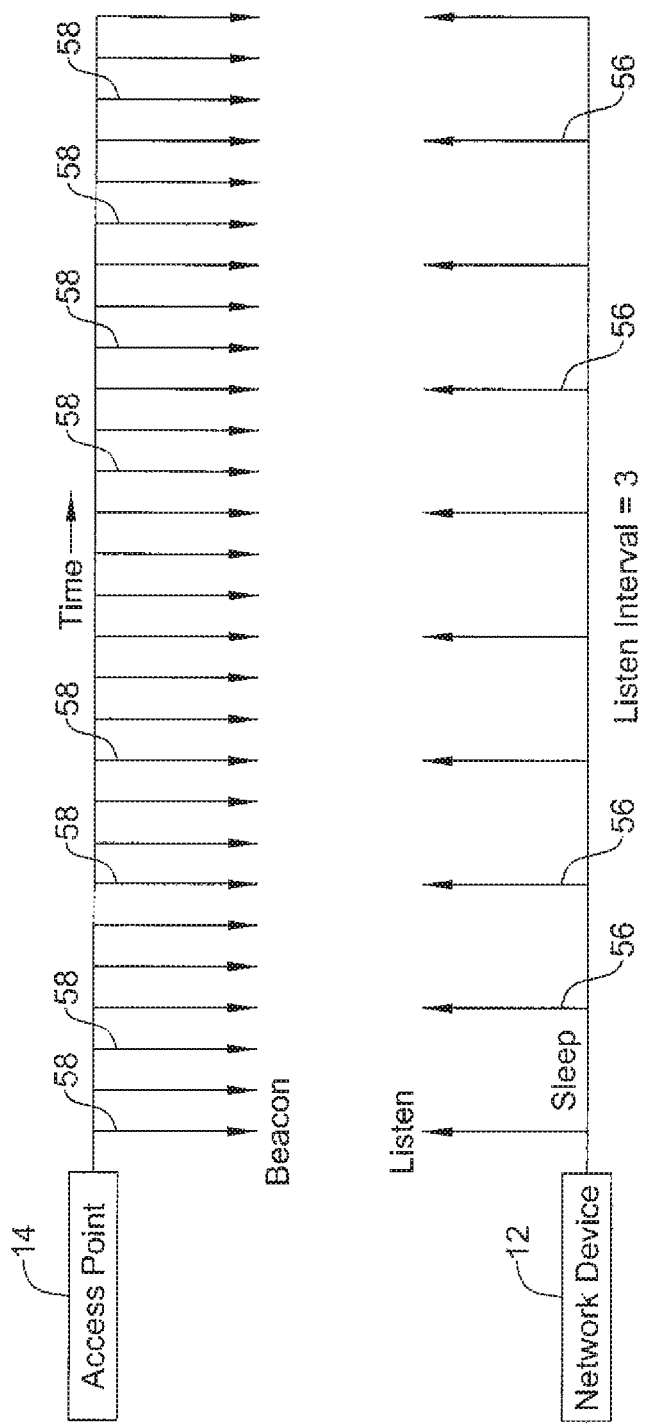
FIG. 3 is a schematic diagram of an illustrative example of communication over a network.

FIGS. 3-7 illustrate various approaches for communication among computing devices connected to the network 10. FIG. 3 depicts an approach for a network device 12 (e.g., a low power device connected to the network 10) utilizing a power save mechanism to communicate over a network. Illustratively, a low power device may be a network device 12 that is utilizing a power save mode/mechanism (e.g., where the controller 18 of the network device 12 may place the device in a sleep mode or an awake mode according to a schedule to save power over time). In some cases, a power save mode may be selected by a user. Alternatively, or in addition, the network device 12 may automatically enter a power save mode when operating with a power source of a battery, a power stealing mechanism, or other non-line power, power source.

As shown in FIG. 3, an access point 14 for a network (e.g., network 10) may be configured to send beacons 58 to one or more network devices 12 or other devices connected to the network. The beacons 58 may be broadcast from the access point 14 at regular intervals, as discussed above with respect to access point 14.

In one example, the controller 26 of the access point 14 may be configured to initiate the beacons 58. The beacons 58 from the access point 14 may be broadcast from the I/O port 28.

The beacons 58 may provide unicast and/or multicast packets of data (e.g., indications (e.g., indications that messages may be held at the access point 14), information, requests, commands, and/or other data) to devices connected to the network. Multicast and/or broadcast packets of data may be data packets directed to at least two devices connected to the network, whereas unicast data packets may be data packets directed to a specific device connected to the network.

In some cases, the beacons 58 may incorporate address and/or name information for one or more devices connected to the network to which the data in the beacon 58 may be sent. Alternatively or in addition, beacon 58 may be sent to all devices connected to a network without a indicating in the beacon 58 a specific address for the data.

The network devices 12 and/or other devices connected to the network may be configured to listen via the I/O port 20, 40 for a beacon 58 directed at that network device 12. In some cases, the network device 12 may listen 56 for a beacon 58 periodically at a listen interval. In FIG. 3, an example listen interval is three (3) beacons, such that the network device 12 may listen 56 for a beacon 58 at three times a rate at which the beacons 58 may be broadcast (e.g., the network device 12 may listen 56 for every third beacon 58).

A listen interval for a network device 12 may be set by the network device 12 or a manufacturer of the network device 12. Alternatively or in addition, a user of the network device 12 may set the listen interval. In one example, when a beacon 58 is broadcast every 100 ms, an example listen interval might be one second (every ten beacons), two seconds (every twenty beacons 58), four seconds (every forty beacons), and so forth.

Figure 4:
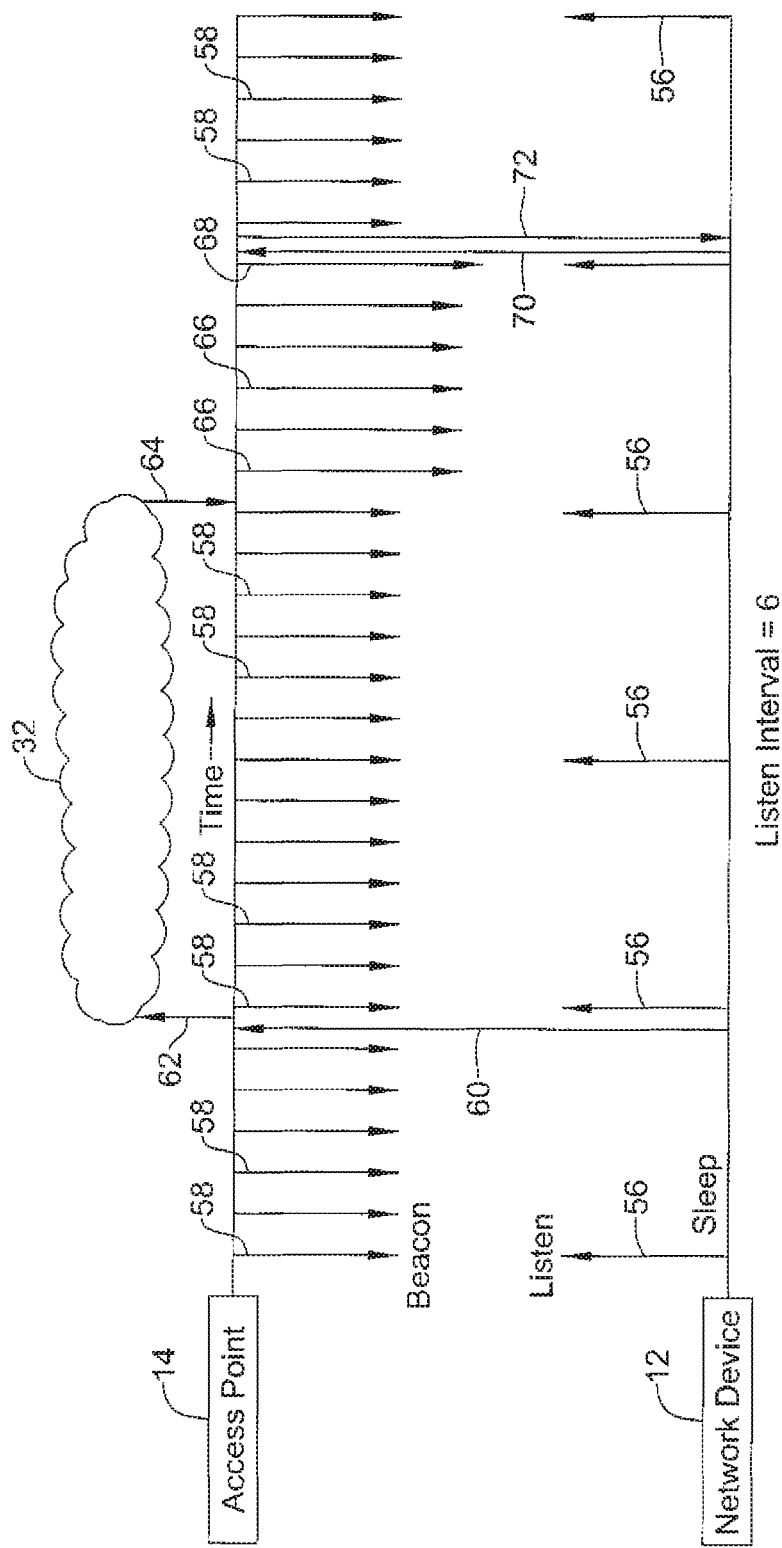
FIG. 4 is a schematic diagram of an illustrative example of communication over a network with a remote server.

FIG. 4 depicts an approach for a network device 12 in a power saving mode (e.g., a low power device) to receive data through an access point 14 (e.g., the network device asks for weather forecast data, where the network device 12 may be a thermostat or other building automation device). At arrow 60, the network device 12 may send a request for data, as initiated by the controller 18 and broadcast via I/O port 20, to the access point 14 and at arrow 62, the access point 14 may direct the data request from the network device 12 to another device connected to the network or a server 32 connected to the access point 14. In some cases, devices may be connected to the access point 14 over a first network (e.g., a LAN), and the server 32 may be connected to the access point 14 over a second network (e.g., a WAN), but this is not necessarily required. After receiving the data request, the server 32 may send the requested data back to the access point 14 at arrow 64. Then, at arrows 66 the access point 14 may broadcast beacons (e.g., beacons with a traffic indication map (TIM)) that indicate the access point 14 is holding data for the network device 12.

As the data received from the server 32 may be directed at a single network device 12 (e.g., as it was requested by a single network device 12), the data may be a unicast packet of data and the access point 14 may able to keep the data until the network device 12 is ready to receive the data. At arrow 68 from the access point 14, when the network device 12 wakes up and a listen interval lines up with a beacon from the access point 14 and sees a beacon with a TIM for the network device 12, the network device 12 may now know that the access point 14 is holding data to be delivered to it. At arrow 70, the network device 12 may broadcast to the access point 14 that it would like its data now. Then at arrow 72, the access point 14 may send the data to the network device 12. After the network device 12 has received its data, the network device 12 may go back to sleep and listen 56 for communication on the network only every listen interval or other interval.

Figure 5:
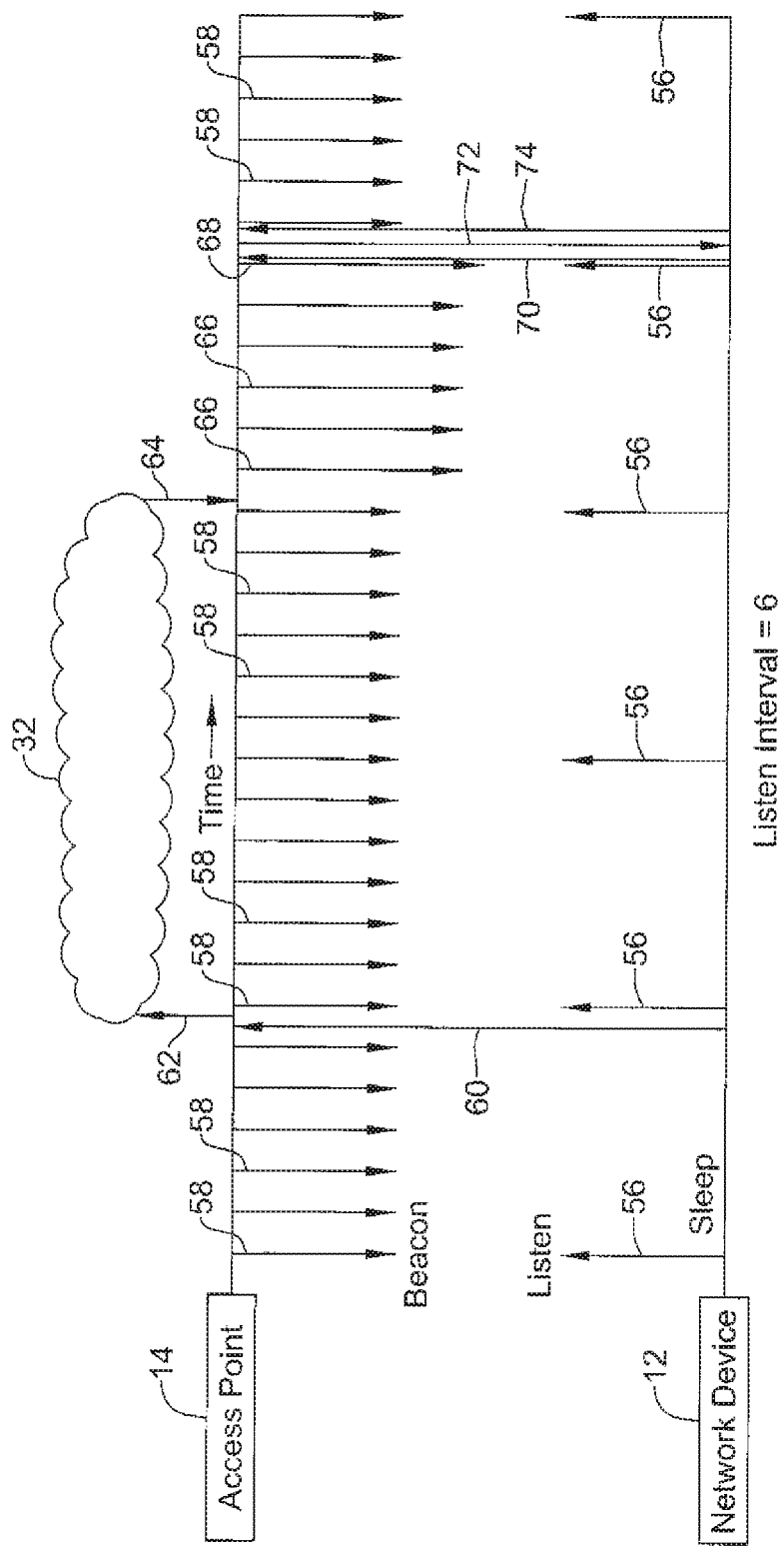
FIG. 5 is a schematic diagram of a further illustrative example of communication over a network with a remote server.

FIG. 5 depicts another approach for a network device 12 in a power saving mode (e.g., a low power device) to receive data through an access point 14 (e.g., the network device asks for weather forecast data, where the network device 12 may be a thermostat or other building automation device). The network device 12 may request data via the access point 14 and the access point 14 may receive the requested data in a similar manner to as is shown in FIG. 4. Then, at arrows 66 the access point 14 may broadcast beacons (e.g., beacons with a traffic indication map (TIM)) that indicate the access point 14 is holding data for the network device 12.

As was the case with respect to the approach depicted in FIG. 4, the data received from the server 32 may be directed at a single network device 12 and may be a unicast packet of data that the access point 14 may be able to keep until the network device 12 is ready to receive the data. At arrow 68 from the access point 14, a listen interval lines up with a beacon from the access point 14 and the network device 12 may now know that the access point 14 is holding data to be delivered to the network device 12. At arrow 70, the network device 12 may broadcast to the access point 14 that it is now awake and ready to receive the data being held by the access point 14. At arrow 72, the access point 14 may send (e.g., broadcast) the data to the network device 12. After the network device 12 has received its data, the network device 12 at arrow 74 may tell the access point 14 that it is going back to sleep and not to send any more data. The network device may then go back to sleep and listen 56 for communication on the network only every listen interval or other interval.

Figure 6:
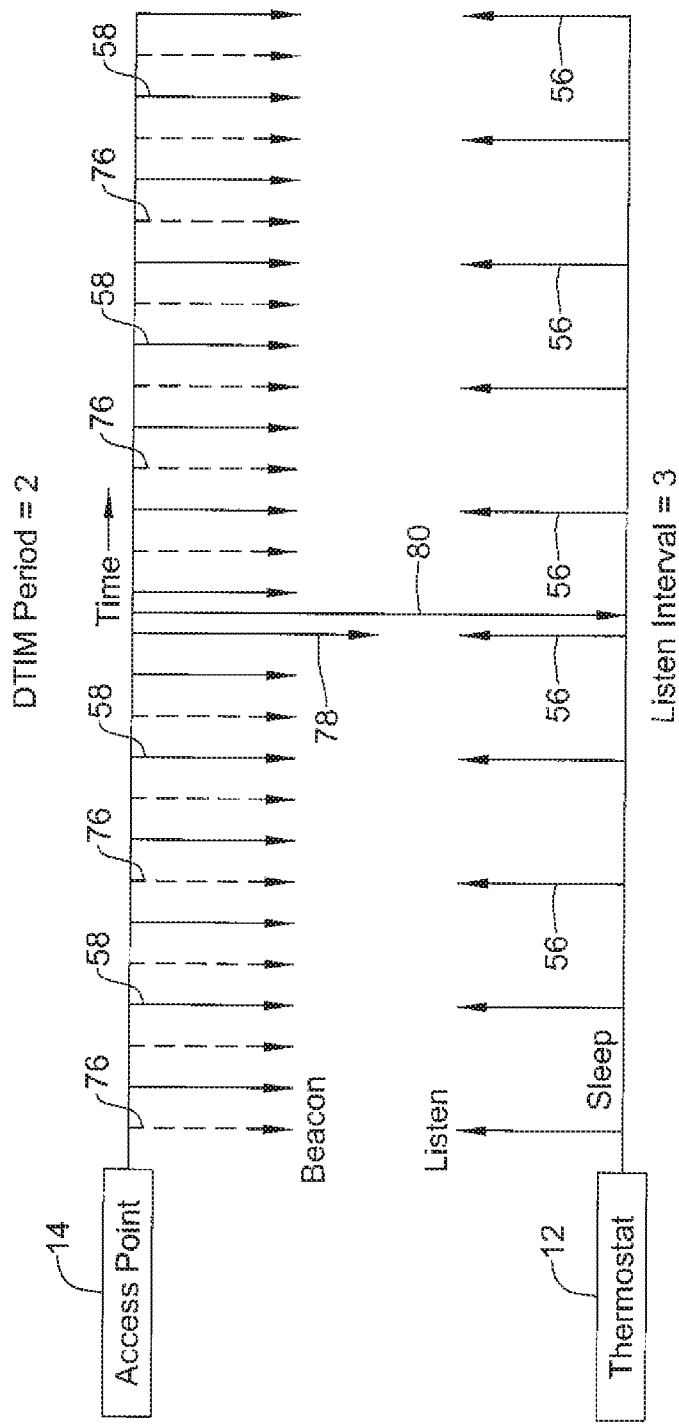
FIG. 6 is a schematic diagram of an illustrative example of communication of multicast packets of data over a network.

In some cases, a beacon 58 may incorporate a distributed traffic indication map (DTIM). As shown in FIG. 6, DTIM beacons from the access point 14 may be represented by dashed arrows 76 and elongated arrow 78. The DTIM beacons in FIG. 6 are every other beacon and thus, have a period of 2 beacons. However, other periods are possible.

A DTIM may indicate an access point 14 has multicast and/or broadcast data packets for immediate or nearly immediate delivery by the access point 14 to devices connected to the network. A DTIM period may be an interval between beacons 58 with a DTIM.

The DTIM period of an access point 14 may be set by the access point 14 or a manufacturer of the access point 14 and/or by a user of the access point 14. A DTIM period may be set to 1 beacon, 2 beacons, 3 beacons, 5 beacons, 10 beacons or other number of beacons, as desired.

In FIG. 6, the DTIM beacon represented by arrow 78 may line up with when the network device 12 (e.g., a thermostat) is listening for a beacon. As a result, the network device 12 may determine it will stay awake to ensure it receives the multicast packet of data broadcast from the access point, as represented by arrow 80. After receiving the multicast packet of data from the access point 14, the network device 12 may go back to sleep and resume listening for beacons at regular listening intervals or other intervals.

Figure 7:
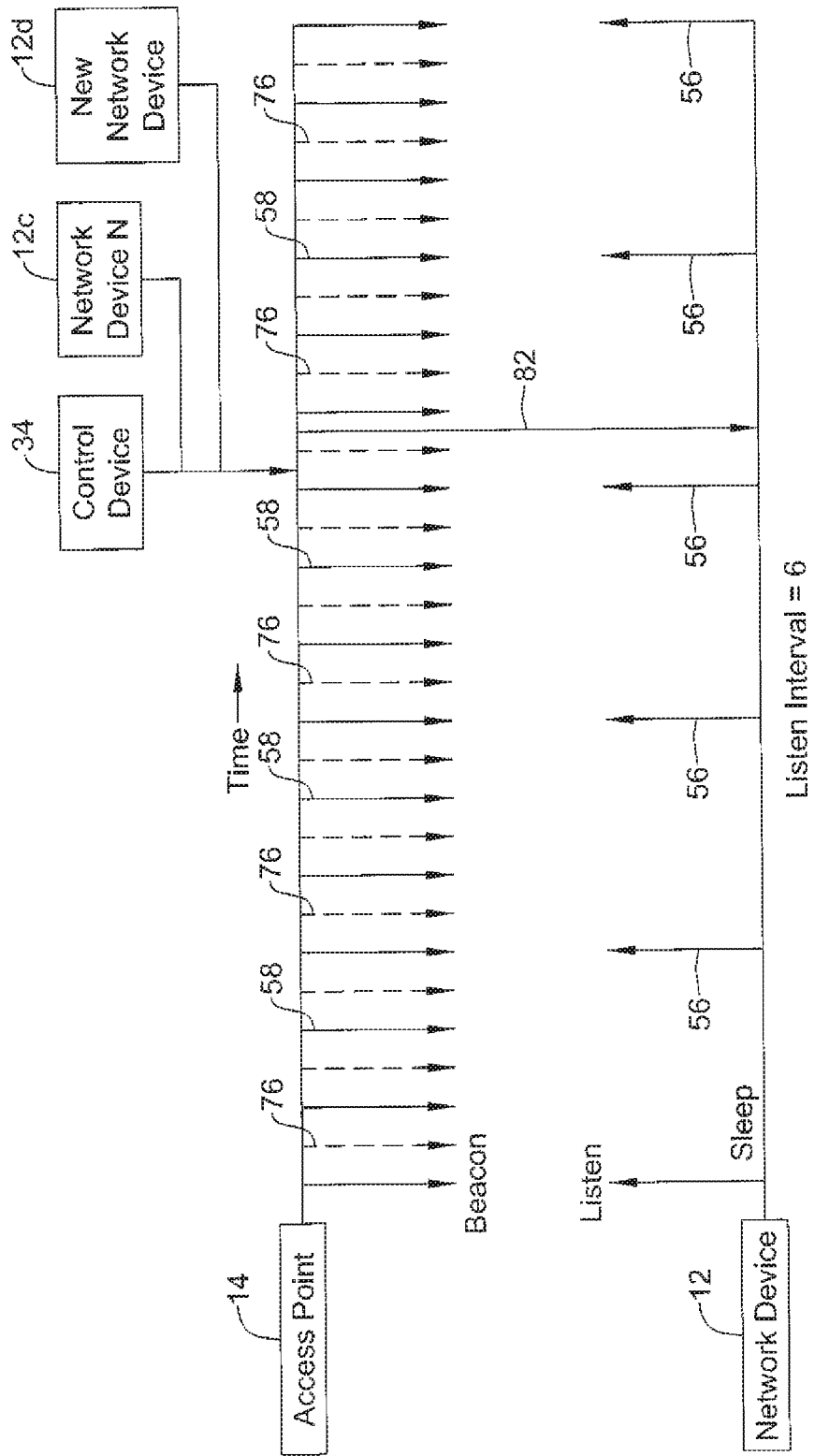
FIG. 7 is a schematic diagram of a further illustrative example of communication of multicast packets of data over a network.

FIG. 7 depicts an approach similar to that of FIG. 6, but where the network device 12 may miss a multicast packet of data that is broadcast by the access point 14. However, in addition to the network device 12 being in communication with the access point 14 over the network, a control device 34 (e.g., a network device 12), a network device N 12c, and a new network device 12d (e.g., a new network device 12d may be a network device 12 that recently connected to the network) may be in communication with the access point 14 over the network. As with FIG. 6, the DTIM beacons represented by arrows 76 may have a period of two beacons, but this is not necessarily required.

As can be seen in FIG. 7, when the network device 12 is awake and listening for beacons 58 from the access point 14 as represented by arrows 56, it may not always line up with a DTIM beacon represented by arrows 76. As a result, the network device 12 may be unaware that the access point 14 may have received a multicast packet of data to be distributed immediately or nearly immediately. Because the network device 12 may not know that the access point 14 has a multicast packet of data to be broadcast, the network device 12 may go to sleep and miss the broadcast of the multicast packet of data as represented by arrow 82.

FIG. 7 illustrates the multicast packet of a data reception issue. That is, low power devices may need to sleep or have a sleep mode (e.g., have periods of time when the device is not listening/looking for data), but when the low power devices are asleep, the low power devices may miss multicast packets of data that are broadcast. To receive all multicast packets of data, a network device 12 (e.g., a low power device) may need to listen to all DTIM beacons broadcast by the access point 14. However, listening to all DTIM beacons may be power intensive, especially if a DTIM period is small (e.g., 100 ms, 200 ms, and so on).

FIGS. 8-14 depict interactions between devices on a network. As shown in FIGS. 8-14, a control device 34, a new network device 12d, and a network device N 12c may communicate over a network (e.g., network 10 via an access point 14, where an access point 14 has been omitted from FIGS. 8-14 for clarity purposes). As shown in FIGS. 8-11, 13, and 14, three example instances of interactions between the control device 34, a new network device 12d, and network device N 12c are depicted: name conflict resolution on the network; service discovery of devices on the network; and address and other detail resolution on the network. FIGS. 8-14 depict query arrows 44 and response arrows 46, where the flow of a conversation between devices may be followed by following the query arrows 44 and response arrows 46 over time (e.g., from top to bottom).

Broadcast responses, as represented by arrows 46, may incorporate one or more details about the network device 12 from which the arrows originate. The broadcast responses may incorporate IP address information, device name information, service name information, SRV records, PTR records, TXT records, and/or other information and/or data from the network device 12.

Figure 8:
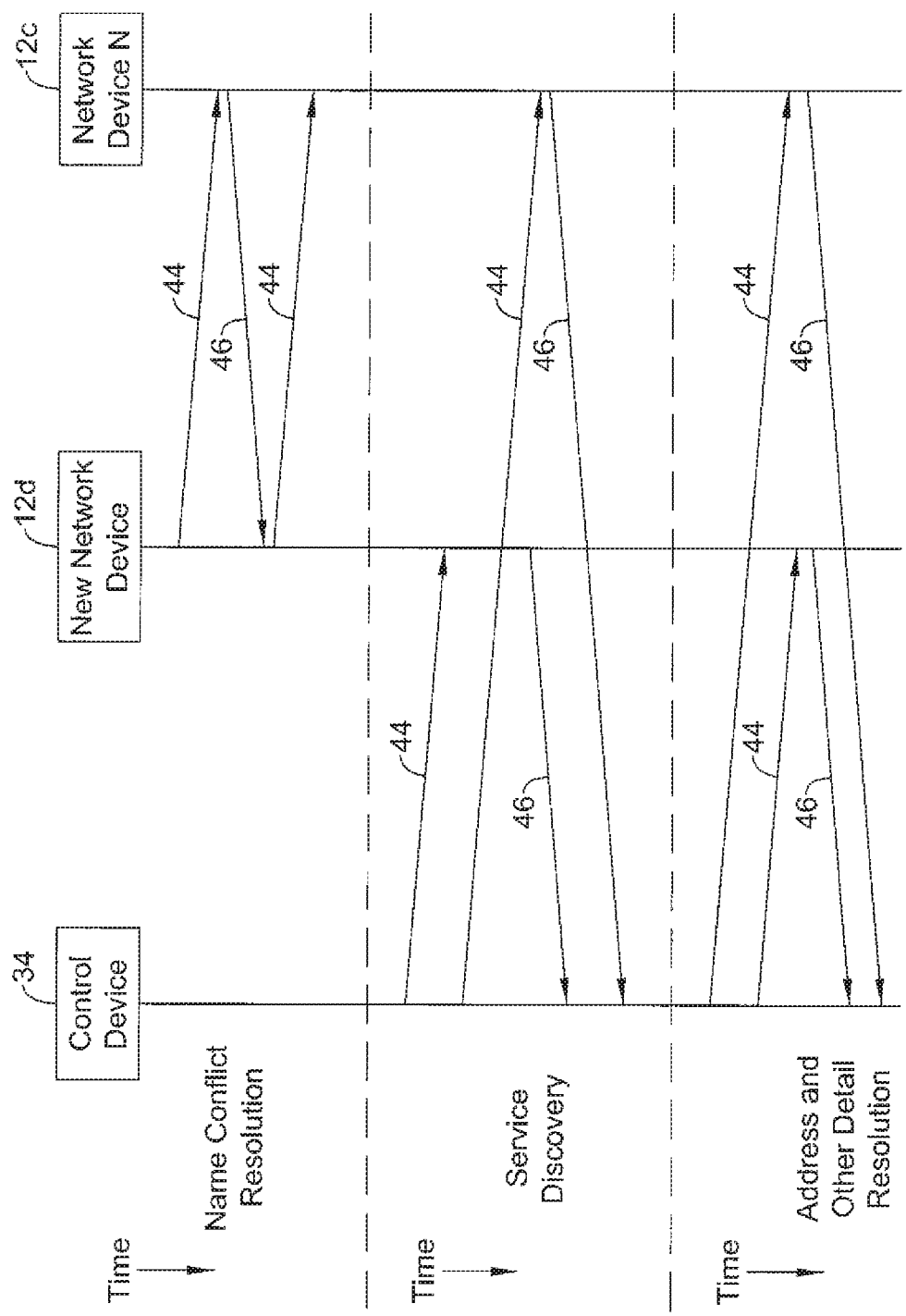
FIG. 8 is a schematic flow diagram of illustrative examples of communications over a network.

FIG. 8 depicts interactions between the devices on the network where network device N 12c may always be listening for beacons from an access point (e.g., the device N 12c may be connected to line power or any other sustained power supply as a power source). With a Name Conflict resolution procedure, a new network device 12d may enter a network (e.g., network 10) and inquire over the network whether any other device connected to the network has a name that the new network device 12d is choosing for itself. In one example, a new network device 12d may boot up and select a name. Then, the new network device 12d, as initiated by a controller 18, may send or broadcast via the I/O port 20 a multicast query at arrow 44 asking whether any other device on the network has a name that is the same as the selected name. Network device N 12c, which may be in an awake mode, may receive this query and if the device has the same name as the name selected by the new network device 12d (e.g., both network devices 12 may be a same type of thermostat or other building automation device), the network device N 12c may respond, as initiated by the controller 18, at arrow 46 via the I/O port 20 indicating it has the same name as the selected name. As a result of receiving the response from the network device N 12c, the new network device 12d may select another name and send out a further multicast query at arrow 44 asking whether any network device 12 on the network has the newly selected name.

With a service discovery procedure as seen in FIG. 8, a control device 34 may enter a network having the new network device 12d and the network device N 12c, among optionally other network devices 12. The control device 34 may send out a multicast query at arrows 44 to the new network device 12d and the network device N 12c asking what services are offered by the network devices 12 connected to the network. Then, the new network device 12d and the network device N 12c being in an awake mode may receive the multicast query and respond at arrows 46 to the query with an indication of the services offered by the specific network device 12.

With an address and other detail resolution as seen in FIG. 8, a control device 34 may enter a network having the new network device 12d and the network device N 12c, among optionally other network devices 12. The control device 34 may send out a multicast query at arrows 44 to the new network device 12d and the network device N 12c asking for address and/or name details from the network devices 12 connected to the network. Then, the new network device 12d and the network device N 12c being in an awake mode may receive the multicast query and respond at arrows 46 to the query with an indication of the details requested in the query.

Figure 9:
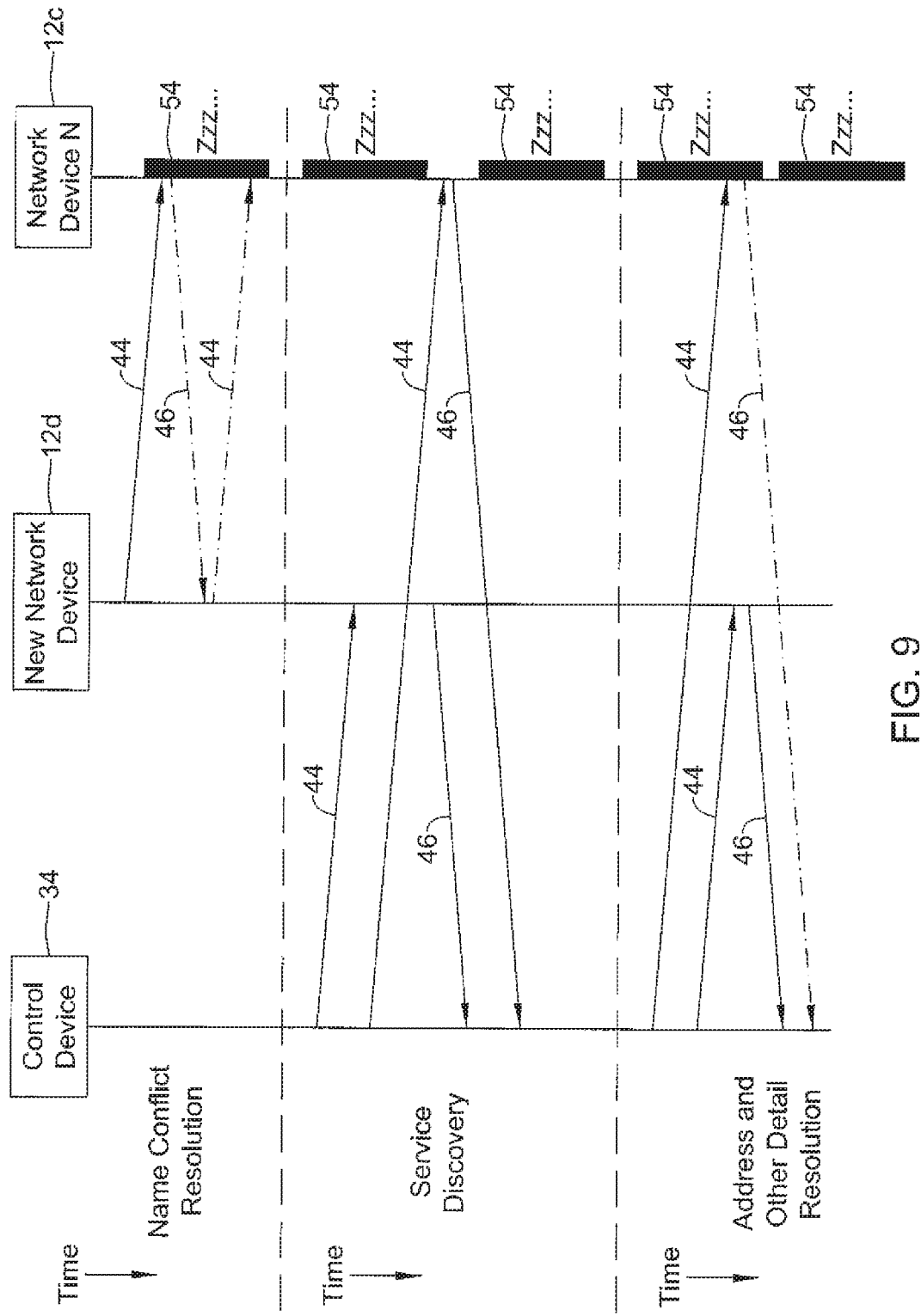
FIG. 9 is a schematic flow diagram of illustrative examples of communications over a network with a low power device.

FIG. 9 depicts the problem referred to above with respect to FIG. 7 and low power network devices 12 not receiving all multicast packets of data that are broadcast from an access point 14. In FIG. 9, the network device N 12c may be a low power network device that enters a sleep mode (e.g., represented by boxes 54) to save power. Although the boxes 54 may be spaced at different intervals and/or have different sizes, the sleep and listen intervals may be consistent (e.g., substantially always the same) or vary over time.

As seen in FIG. 9 with respect to the service discovery procedure, a multicast query at arrows 44 may happen to reach the low power network device N 12c when the device is in an awake mode and the low power network device N 12c may respond at arrow 46, but it may not always be the case that network device N 12c will receive a multicast query when it is in an awake mode. For example, as with the name conflict resolution period and the address and other detail resolution procedure, the multicast query as represented by arrows 44 may reach the low power network device N 12d while the low power network device N 12d is in a sleep mode and is not listening for a beacon. As a result, the network device 12 (e.g., new network device 12d or control device 34) making the query may not necessarily receive all of the information it needs, as represented by dash-dot arrows 44 and 46.

FIGS. 10-14 illustrate various approach to a solution to the issues illustrated in FIGS. 7 and 9 and discussed above. In each approach illustrated, the network device N 12c may be a low power network device 12 with a controller configured to place the low power network device 12 into a first mode (e.g., a sleep mode where it may not be listening for beacons and/or multicast packets of data) and a second mode (e.g., an awake mode where it may be listening for beacons and/or multicast packets of data). The various approaches may be used in combination with one another and/or individually.

Figure 10:
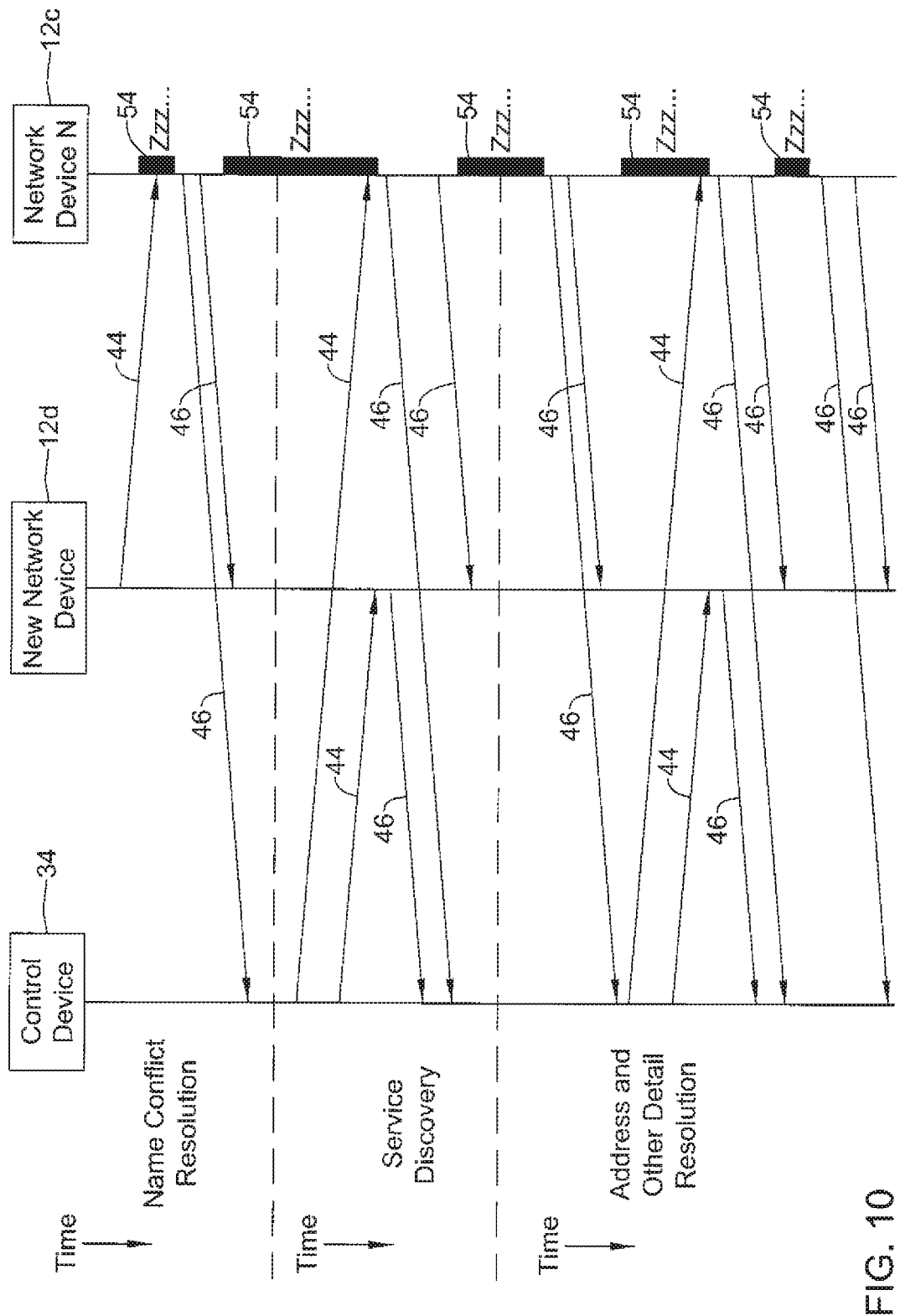
FIG. 10 is a schematic flow diagram of further illustrative examples of communications over a network with a low power device.

FIG. 10 illustrates a gratuitous response approach. In the gratuitous response approach, the low power network device N may automatically broadcast and/or send a response at arrows 46 extending from the network device N 12c to the access point (not shown) and all network devices 12 on the network (e.g., control device 34, new network device 12d and/or other network devices 12) when it exits a sleep mode 54 and/or enters an awake mode without first being prompted by a request from another network device 12 received via the access point. The automatic responses may be broadcast from the low power network device N 12c via the I/O port 20 upon exiting the sleep mode and/or entering the awake mode, or within a set period of time (e.g., one second, two seconds, three seconds, five seconds, or other period of time) of doing so. The automatic responses from the low power network device N 12c may incorporate details of the network device N 12c (e.g., device name, the services it renders (e.g., its functionality), its address, and so on), which may incorporate SRV records, PTR records, TXT records, and/or other records.

In addition to or instead of automatically sending a response when the low power network device N 12c exits a sleep mode or enters an awake mode, the low power network device N 12c may send out its details at regular periodic intervals (e.g., after a period of time since the last broadcast of its details). In one example, the low power network device N 12c may be configured to send out its details once every second, once every two seconds, once every three seconds, once every five seconds, once every ten seconds, once every twenty seconds, and/or at a different time period, which may or may not coincide with waking up from a sleep mode.

With the gratuitous response approach, the network device N 12c may not need to know if another network device 12 is requesting information and or sending a multicast query. As a result, all network devices 12 may be regularly updated with the details for the low power network devices N 12c and the network devices 12 may not be missing details for various low power network devices 12 on the network.

Figure 11:
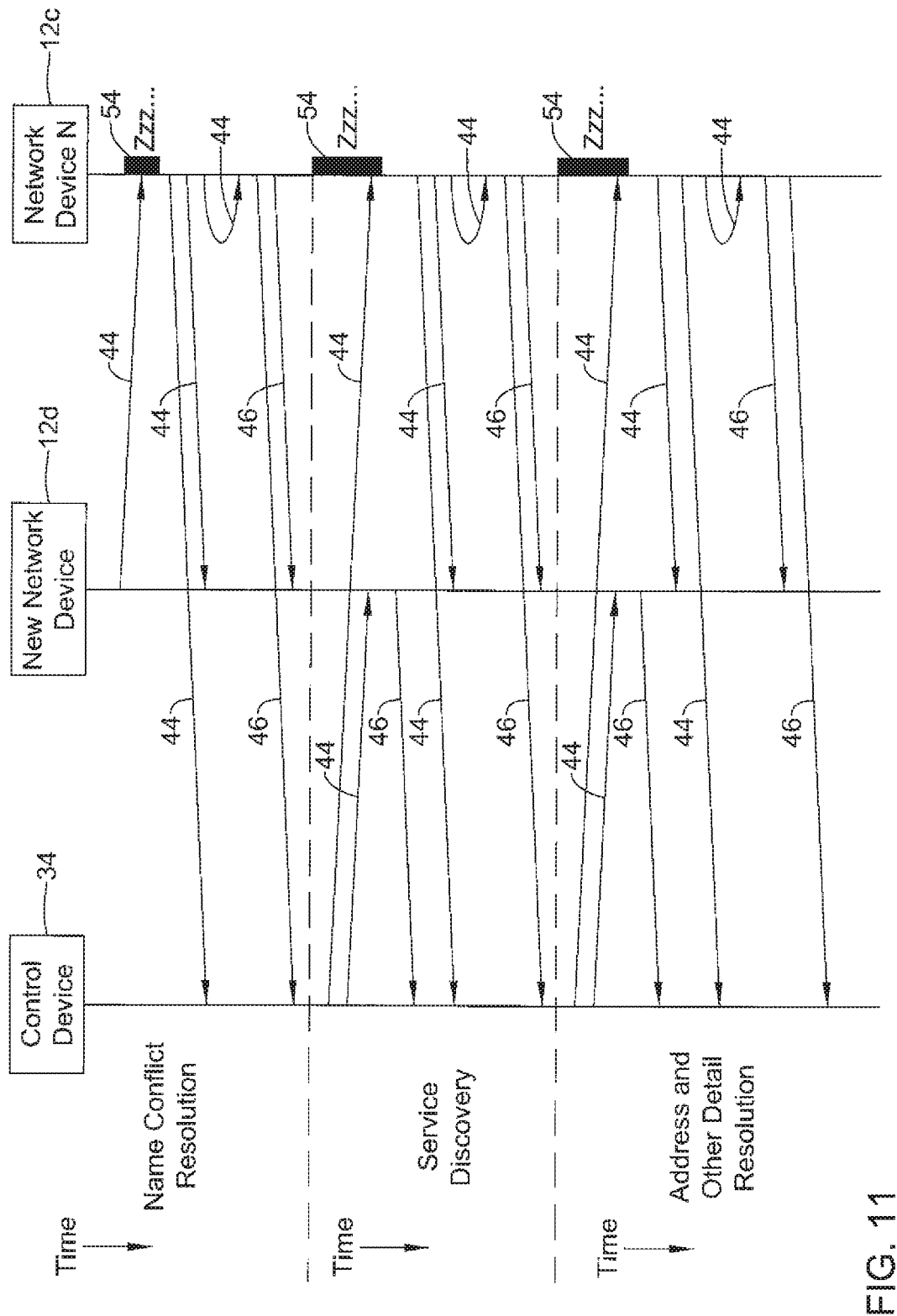
FIG. 11 is a schematic flow diagram of further illustrative examples of communications over a network with a low power device.

FIG. 11 illustrates a gratuitous query request and query response approach. In the gratuitous query request and response approach, the low power network device N 12c may automatically broadcast and/or send via an I/O port 20 a query request at arrows 44 to the access point (not shown) and all of the network devices 12 on the network. The low power network device N 12c may receive via the I/O port 20 and from the access point, the query request it sent and then, broadcast on a response to the query request at arrows 46 from the network device N 12c via the I/O port 20 to the access point (not shown) and all network devices 12 on the network (e.g., control device 34, new network device 12d and/or other network devices 12). The controller 18 of the low power network device N 12c may initiate this procedure when it exits a sleep mode 54 and/or enters an awake mode without first being prompted by a query request from another network device 12. The automatic queries and responses to the requests may be broadcast from the low power network device N 12c via the I/O port 20 upon exiting the sleep mode and/or entering the awake mode, or within a set period of time (e.g., one second, two seconds, three seconds, five seconds, or other period of time) of doing so. The automatic query and responses from the low power network device N 12c may incorporate details of the network device N 12c (e.g., device name, the services it renders (e.g., its functionality), its address, and so forth), which may incorporate SRV records, PTR records, TXT records, and/or other records.

In addition to or instead of automatically sending a query and a response when the low power network device N 12c exits a sleep mode or enters an awake mode, the low power network device N 12c may broadcast and/or send out a query and its response with device specific details at regular periodic intervals (e.g., after a period of time since the last broadcast of its details). In one example, the low power network device N 12c may broadcast a query request and then respond to its own query request by broadcasting and/or sending its details, where the query request may be initiated by the controller 18 thereof at intervals of once every second, once every two seconds, once every three seconds, once every five seconds, once every ten seconds, once every twenty seconds, and/or at a different time period, which may or may not coincide with waking up from a sleep mode.

With the gratuitous query request and response approach, the low power network device N 12c may not need to know if another network device 12 is requesting information and or sending a multicast query. As a result, all network devices 12 may be regularly updated with the details for the low power network devices N 12c and the network devices 12 may not necessarily be missing details for various low power network devices 12 on the network.

Figure 12:
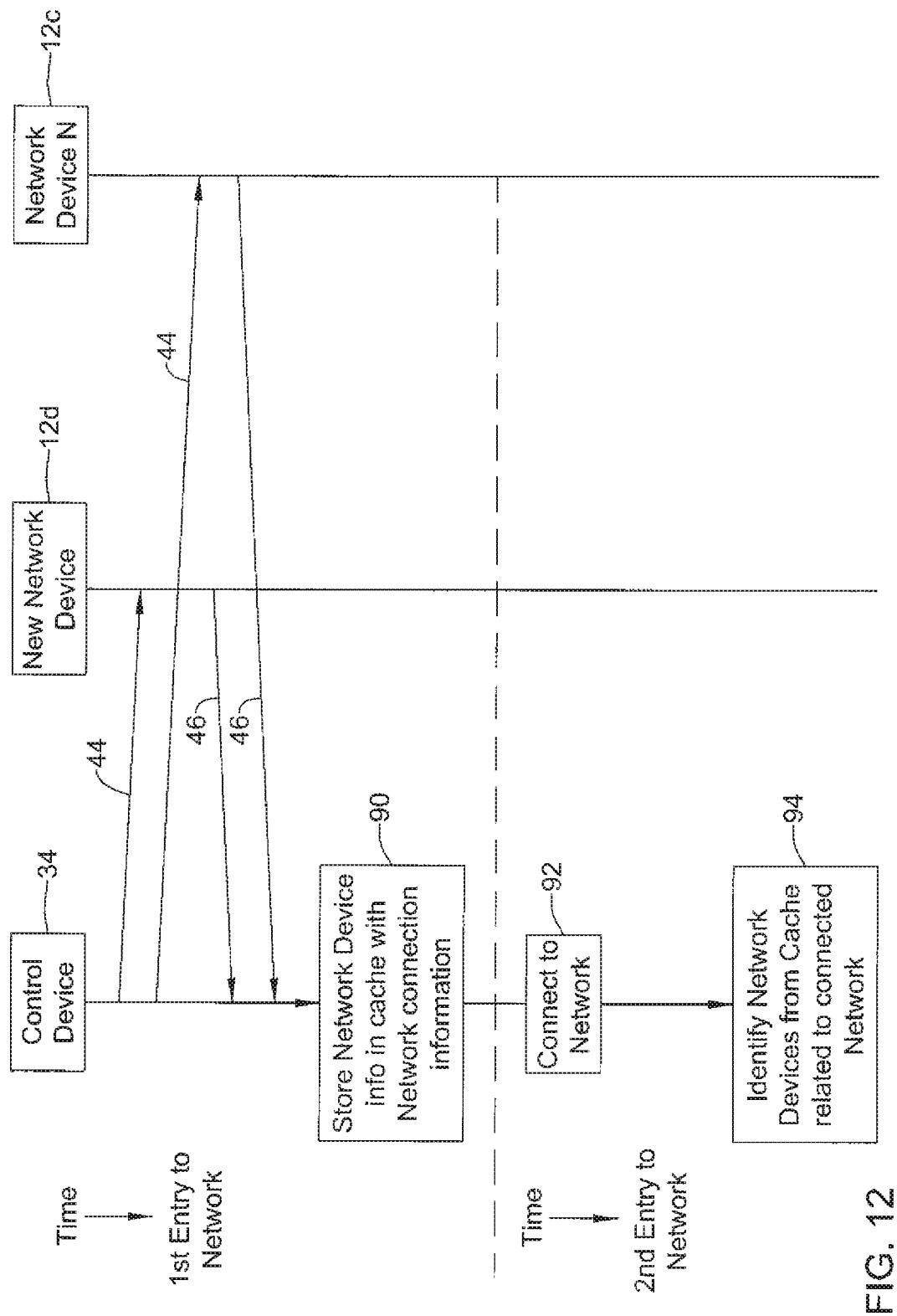
FIG. 12 is a schematic flow diagram of further illustrative examples of communications over a network with a low power device.

FIG. 12 illustrates a cached information about a service/device approach. In the cached information about a service/device approach, a control device 34 or other network device 12 on a network may broadcast and/or send a query request as indicated at arrows 44 via an I/O port to an access point (not shown) and therethrough to virtually all of the network devices 12 on the network (e.g., the new network device 12d and the network device N 12c, as shown in FIG. 12). At arrows 46, each of the network devices 12 that receive the query request (e.g., the new network device 12d and the network device N 12c) may broadcast and/or send a response at arrows 46 via respective I/O ports 20 to the control device 34. The responses may incorporate one or more details about the respective network device 12 (e.g., device names, services names, IP addresses, port numbers, and so on). After the control device 34 or other device receives responses from the network devices 12 on the network, the control device may store the network device 12 information (e.g., details) in its memory 36 (e.g., cache) and tie the network device information to details about the network (e.g., login credentials for network 10, address information for network 10, and so forth), at box 90, and connect to the network via box 92.

If or when the control device 34 disconnects from the network and reconnects at a later time, the control device 34 may look for the devices and/or services it has associated with the network in its memory 36, as seen at box 94. In some cases, the control device 34 may then broadcast unicast data packets to the access point (not shown) for network devices 12 stored in its memory 36, where the unicast data packets may request updated details from the specific network device 12 to which it is broadcast and/or sent.

Figure 13:
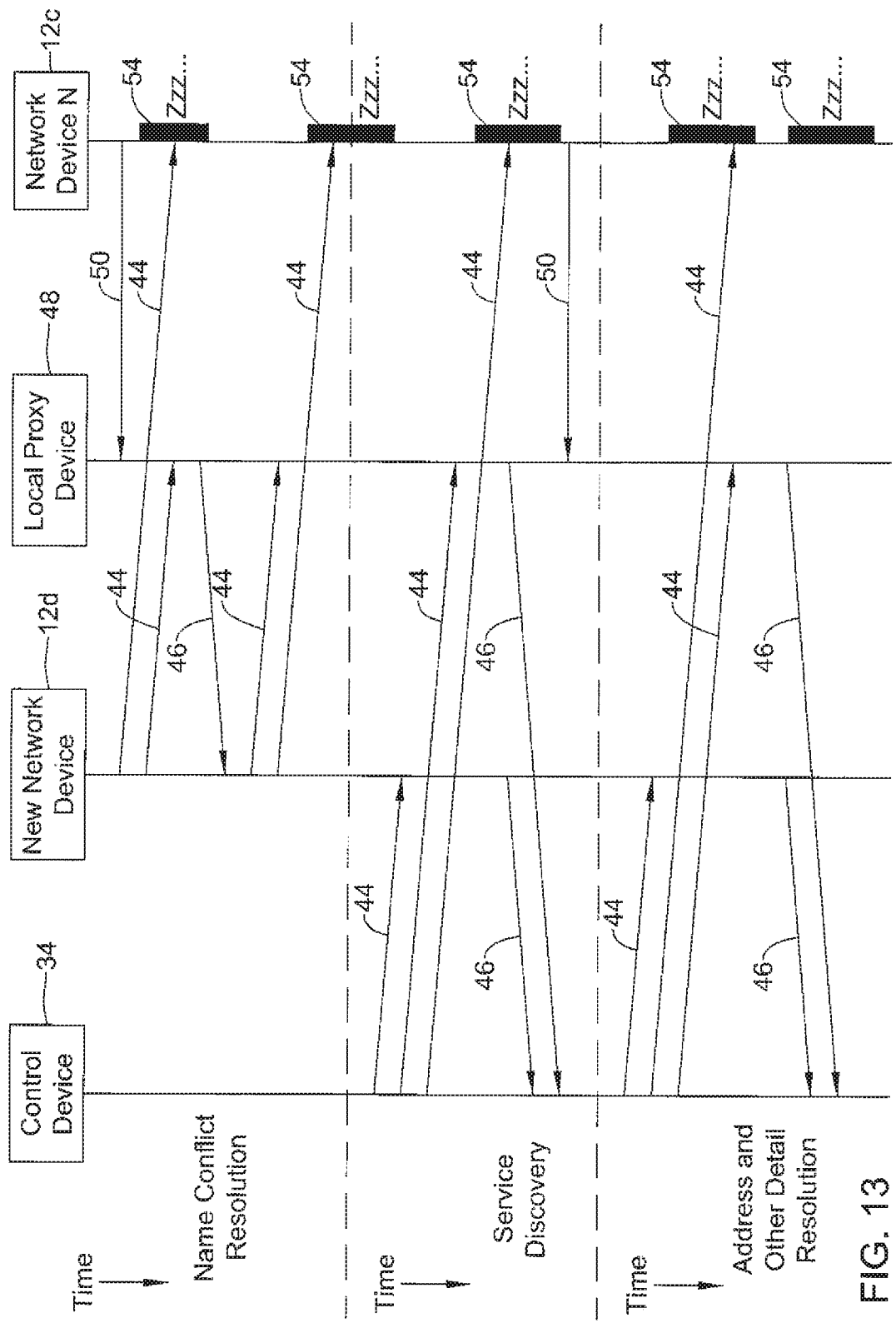
FIG. 13 is a schematic flow diagram of illustrative examples of communications over a network with a low power device via a proxy.

FIG. 13 illustrates a local area sleep/multicast proxy approach. In the local area sleep/multicast proxy approach, a local proxy device 48 may be utilized. The local proxy device 48 may be a computing device (e.g., a network device 12) having a memory, a controller, an I/O port, and a power source, among other components and similar to as discussed above with respect to other computing devices. The local proxy device 48 may be capable of connecting to the network via its I/O port and specifically configured to act as a proxy for the low power network device N 12c, which may be configured to put itself into a sleep mode and/or an awake mode to save power during operation. The power source of the local proxy device 48 may be line power or other source of power. Additionally, the local proxy device 48 may always or substantially always be in an awake mode listening for beacons directed at one or more network device for which it is acting as a proxy.

Once the local proxy device 48 and the low power network device N 12c are connected to the network, the local proxy device 48 and the low power network device N 12c may identify each other and begin broadcasting and/or sending information to each other. The local proxy device 48 and the low power network devices N 12c may communicate between one another in any manner to allow a low power network device N 12c to provide the local proxy device 48 its updated details and/or to allow the local proxy device 48 to provide commands (e.g., from a control device 34) and/or the information to the low power network device N 12c. In one example, the local proxy device 48 may send unicast data packets to the low power network device N 12c to request updated information and/or send commands/information. Alternatively, or in addition, the low power network devices N 12c may use periodic state information updates to provide the local proxy device 48 with its updated information and/or to request information. The periodic state information updates may be provided without a request from the local proxy device 48.

The local proxy device 48 and the low power network device N 12c may communicate over any communication protocol. In one example, the local proxy device 48 and the low power network device N 12c may communicate through any connection including, but not limited to, radio communication, Ethernet, cellular communication, ZigBee, RED-LINK™, Bluetooth, Bluetooth Low Energy (BLE), Wi-Fi, IrDA, dedicated short range communication (DSRC), EnOcean, Near Field Communication (NFC), and/or any other suitable common (non-proprietary) or proprietary wired or wireless protocol.

In the local area sleep/multicast proxy approach, the low power network device N 12c may provide its details to the local proxy device 48, as represented by arrow 50, and the local proxy device 48 may store the received details in its memory (e.g., cache). Thereafter, an access point may broadcast multicast packets of data (e.g., from other network devices 12 on the network, such as control device 34, new network device 12d, or other network devices 12) for the low power network device N 12c and other network devices 12, as represented by arrows 44. Although arrows 44 are depicted in FIG. 13 as extending to the low power network device N 12c, the multicast packets of data broadcast from the access point may or may not be sent to the low power network device N 12c.

The local proxy device 48 may be continually or substantially continuously listening for data packets via a beacon from the access point that are directed at the low power network devices N 12c for which it is acting as a proxy. The local proxy device 48 may identify multicast packets of data for the low power network devices N 12c and in response to the local proxy device 48 identifying and receiving a query request for the low power network device N 12c via multicast packet of data, the local proxy device 48 (e.g., as initiated by the controller of the local proxy device 48) may respond and broadcast one or more details of the low power network device N 12c to the access port and the network device 12 that sent the query request. The responses from the local proxy device 48 may incorporate details of the low power network device N 12c (e.g., device name, the services it renders (e.g., its functionality), its address, and so on), which may incorporate SRV records, PTR records, TXT records, and/or other records.

The local proxy device 48 may then send any information it receives to the low power network device N 12c through a unicast packet of data and/or by using periodic state information updates. To do this, the local proxy device 48 may translate multicast packets of data for the low power network device N 12c into unicast packets of data for which the low power network device N 12c may be listening when it is in an awake mode. In some cases, the local proxy device 48 may be configured to broadcast and/or send the unicast packet of data to the low power network device N 12c at predetermined intervals. In one example, the local proxy device 48 may know when the low power network device N 12c may be awake and/or listening for beacons and send the beacons at predetermined intervals associated with those times.

FIG. 14 illustrates a remote (e.g., server-based and/or wide area Bonjour) sleep/multicast proxy approach. In the remote sleep/multicast proxy approach, a remote proxy device 52 may be utilized. The remote proxy device 52 may be a computing device (e.g., a server and/or a system on a server or other device connected to the access point 14 via second network (e.g., a WAN, such as the internet)) having a memory, a controller, an I/O port, and a power source, among other components. The remote proxy device 52 may be capable of connecting to a first network (e.g., a LAN) on which the network devices 12 may be connected through a second network (e.g., a WAN) via its I/O port. The remote proxy device 52 may be specifically configured to act as a proxy for the low power network device N 12c, which may be configured to put itself into a sleep mode and/or an awake mode to save power during operation. The power source of the remote proxy device 52 may be line power or other source of power. Additionally, the remote proxy device 52 may always or substantially always be in an awake mode listening for beacons or other communication signals from a first network access point and related to one or more network devices for which it is acting as a proxy.

To setup a low power network device N 12c with a remote proxy device 52, the low power network device N 12c may register itself with the remote proxy device 52 once it is connected to the first network (e.g., network 10). To facilitate the registration, the remote proxy device 52 may be at a well-known IP address (e.g., an IP address that may be programed into network devices 12).

During registration, the low power network device N 12c may provide its internet service provider (ISP) a provided IP address, its local IP address on the network, its SRV records, its PTR records, its TXT records, its name, the types of services it provides, and/or other information. The remote proxy device 52 may be configured to receive this information through its I/O port and store the information its memory.

The remote proxy device 52 and the low power network devices N 12c may communicate between one another in any manner to allow the low power network device N 12*c* to provide the remote proxy device 52 its updated details and/or to allow the remote proxy device 52 to provide commands (e.g., from a control device 34) and/or other information to the low power network device N 12*c*. In one example, the remote proxy device 52 may send unicast data packets to the low power network device N 12*c* to request updated information and/or send commands/information. Alternatively, or in addition, the low power network devices N 12*c* may use periodic state information updates to provide the remote proxy device 52 with its updated information and/or request information from the remote proxy device 52. The periodic state information updates may be provided without a request from the remote proxy device 52.

In the remote sleep/multicast proxy approach as seen in FIG. 14, the low power network device N 12*c* may provide its details to the remote proxy device 52, as represented by arrow 50, and the remote proxy device 52 may store the received details in its memory (e.g., cache). Thereafter, an access point may broadcast multicast packets of data (e.g., from other network devices 12 on the network, such as control device 34, new network device 12*d*, or other network devices 12) for the low power network device N 12*c*, other network devices 12, and the remote proxy device 52, as represented by arrows 44. Although arrows 44 are depicted in FIG. 14 as extending to the low power network device N 12*c*, the multicast packets of data that are broadcast from the access point and are related to the low power network device N 12*c* may or may not be sent to the low power network device N 12*c*.

The remote proxy device 52 may be continually or substantially continually listening for data packets via a beacon or communication signals from the access point that are directed at the low power network devices N 12*c* for which it is acting as a proxy. In one example, a beacon or communication signal may request address details of all devices connected to the first network (e.g., LAN), request name details of all devices connected to the first network to prevent name duplication on the first network, request names of services provided by all of the devices on the network, and/or one or more other requests, commands, or information. The remote proxy device 52 may identify multicast packets of data for the low power network devices N 12*c* and in response to the remote proxy device 52 identifying and receiving a query request for the low power network device N 12*c* via multicast packet of data, the remote proxy device 52 (e.g., as initiated by a controller of the remote proxy device 52) may respond and broadcast the low power network device N 12*c* information to the access port and the network device 12 that sent the query request. The responses from the remote proxy device 52 may incorporate details of the low power network device N 12*c* (e.g., device name, the services it renders (e.g., its functionality), its address, and so forth), which may incorporate SRV records, PTR records, TXT records, and/or other records.

The remote proxy device 52 may then send any information it has received from network devices 12 to the low power network device N 12*c* through a unicast packet of data and/or by using periodic state information updates. To do this, the remote proxy device 52 may translate multicast packets of data for the low power network device N 12*c* into a unicast packet of data for which the low power network device N 12*c* may be listening when it is in an awake mode. In some cases, the remote proxy device 52 may be configured to broadcast and/or send the unicast packet of data to the low power network device N 12*c* at predetermined intervals. In one example, the remote proxy device 52 may know when the low power network device N 12*c* may be awake and/or listening for beacons and send the beacons at predetermined intervals associated with those times.

A recap may be provided in the following. A computing device may be configured to communicate over a network via an access point while limiting a total amount of power expended during operation of the computing device. The computing device may incorporate an input/output (I/O) interface, a memory, and a controller coupled to the I/O interface and the memory. The controller may place the computing device into a first mode and a second mode. The second mode may allow the controller to listen via the I/O interface for a beacon from an access point of a network to which the computing device is connected. The controller may broadcast one or more details about the computing device to the access point within a predetermined amount of time after exiting the first mode and without being prompted by a request received from the access point.

The controller of the computing device may broadcast the one or more details about the computing device in response to exiting the first mode. In some cases, the controller of the computing device may be configured to automatically broadcast the one or more details about the computing device in response to exiting the first mode.

The predetermined amount of time after exiting the first mode at which the controller may broadcast one or more details about the computing device may be twenty seconds from an immediately prior time the one or more details about the computing device were broadcast.

The controller of the computing device may broadcast the one or more details about the computing device to the access point within the predetermined amount of time after exiting the first mode and entering the second mode.

The computing device may incorporate a power source. In some cases, the power source may incorporate a battery.

In some cases, during operation of the computing device, less energy may be used when the computing device is in the first mode than when the computing device is in the second mode.

The first mode of the computing device may be a sleep mode.

The sleep mode of the computing device may be a mode in which the computing device does not listen for a beacon from the access point.

The one or more details about the computing device may incorporate a plurality of details. In one example, the details may incorporate one or more of a service record (SRV record), a pointer record (PTR record), and a text record (TXT record).

The one or more details about the computing device may incorporate a plurality of details. In one example, the details may incorporate one or more of an internet protocol (IP) address and a name for the computing device.

The controller of the computing device may broadcast a multicast request for information from devices on the network. In some cases, the controller may broadcast the multicast request automatically after exiting the first mode. The controller may respond to the multicast request for information by broadcasting the one or more details about the computing device to the access point.

A system for communicating over a local area network via an access point may incorporate an access point and a building automation device in communication with the access point over a local area network. The access point may broadcast multicast packets of data over the local area network to a plurality of devices connected to the local area network. The plurality of devices may incorporate the building automation device. The access point may receive from the plurality of devices a response to the multicast packets of data that have been broadcast over the local area network. The building automation device may have a sleep mode during which the building automation device is not listening for broadcasts from the access point. The building automation device may broadcast one or more details about the building automation device to the access point in response to exiting the sleep mode.

The building automation device may be powered by one or more batteries for a period of time during operation of the building automation device.

The building automation device may enter and exit the sleep mode when the building automation device is being powered by one or more batteries.

The building automation device may reduce an amount of power consumed during operation of the building automation device over a time period. In some the amount of power may be reduced by entering and exiting the sleep mode and automatically broadcasting one or more details about the building automation device to the access point in response to exiting the sleep mode as compared to an amount of power consumed during operation of the building automation device over the time period when listening for a broadcast from the access point at a rate at which the access point broadcasts multicast packets of data.

The building automation device may broadcast the one or more details about the building automation device to the access point in response to exiting the sleep mode and without being prompted by a request from the access point.

The building automation device may listen for broadcasts from the access point when the building automation device is in a mode other than the sleep mode.

An approach of interacting with an access point for a local area network may incorporate receiving a beacon at a building automation device. The building automation device may be connected to the access point over the local area network and the beacon is from the access point. The approach may incorporate sending a response to the received beacon from the building automation device to the access point. The approach may further incorporate sending one or more details of the building automation device to the access point in response to the building automation device exiting the sleep mode and without a prompt from a beacon that is broadcast by the access point.

In the approach, the building automation device may enter the sleep mode at regular intervals when it is powered by a battery.

In the approach, the building automation device may automatically send the one or more details of the building automation device to the access point in response to exiting the sleep mode.

A computing device may communicate over a network via an access point while limiting a total amount of power expended during operation of the computing device. The computing device may incorporate an input/output (I/O) interface, a memory, and a controller coupled to the I/O interface and the memory. The controller may broadcast via the I/O interface a request for information from devices connected to the network and receive via the I/O interface the request for information from devices connected to the network. In response to receiving the request for information from devices connected to the network, the controller may broadcast via the I/O interface one or more details about the computing device to the access point.

The controller may place the computing device into a first mode and a second mode. The second mode may allow the controller to listen via the I/O interface for the request for information from devices connected to the network.

The controller may place the computing device into a first mode and a second mode. Further, the controller may broadcast via the I/O interface the request for information from devices connected to the network in response to exiting the first mode.

The controller of the computing device may automatically broadcast the request for information from devices connected to the network. In some cases, the controller may broadcast the request in response to exiting the first mode.

The controller of the computing device may broadcast the request for information from devices connected to the network. In some cases, the controller may broadcast the request within a predetermined amount of time after exiting the first mode.

The controller of the computing device may broadcast the request for information from devices connected to the network. In some cases, the controller may broadcast the request within a predetermined amount of time from an immediately prior request for information from devices connected to the network.

The controller of the computing device may broadcast the one or more details about the computing device to the access point. In some cases, the controller may broadcast the one or more details within a predetermined amount of time from an immediately prior broadcast of one or more details about the computing device to the access point.

The computing device may further incorporate a power source. In some cases, the power source may incorporate a battery.

The controller of the computing device may place the computing device into a first mode and a second mode. Less energy may be used by the computing device when it is in the first mode than when the computing device is in the second mode.

The first mode may be a mode in which the computing device is not listening for a beacon requesting information from devices connected to the network.

The one or more details about the computing device may incorporate one or more of a service record (SRV record), a pointer record (PTR record), and a text record (TXT record).

The one or more details about the computing device may incorporate one or more of an internet protocol (IP) address and a name for the computing device.

A system for communicating over a local area network via an access point may incorporate an access point and a building automation device in communication with the access point over a local area network. The building automation device may be one of the plurality of devices connected to the local area network. Further, the building automation device may send to the access point, a multicast packet of data including a request for information from a plurality of devices connected to the local area network. The access point may broadcast the multicast packet of data over the local area network to the plurality of devices connected to the local area network. In response to receiving the multicast packet of data broadcast by the access point, the building automation device may broadcast one or more details about the building automation device to the access point.

The building automation device may be powered by one or more batteries for a period of time during operation of the building automation device.

The building automation device may enter and exit a sleep mode when the building automation device is being powered by one or more batteries. Further, the building automation device may send to the access point in response to exiting the sleep mode the multicast packet of data including the request for information from a plurality of devices connected to the local area network.

The building automation device may reduce an amount of power consumed during operation of the building automation device over a time period by entering and exiting the sleep mode, sending the multicast packet of data, and broadcasting one or more details about the building automation device to the access point in response to receiving the multicast packet of data as compared to an amount of power consumed during operation of the building automation device over the time period when listening for a broadcast from the access point at a rate at which the access point broadcasts multicast packets of data.

The building automation device may automatically broadcast the multicast packet of data. In some cases, the multicast packet of data may be automatically broadcast in response to exiting a sleep mode.

An approach of interacting with an access point for a local area network may incorporate sending from a building automation device to an access point for the local area network a request for information from devices connected to the local area network. The building automation device may be one of the devices connected to the local area network. The approach may further incorporate receiving at the building automation device from the access point the request for information from devices connected to the local area network. In response to receiving the request for information from devices connected to the local area network, the approach may incorporate sending from the building automation device to the access point one or more details about the building automation device.

In the approach, the building automation device, when powered by a battery, may send the request for information from devices connected to the local area network at regular intervals.

In the approach, the building automation device may automatically send the request for information from devices connected to the local area network in response to exiting a sleep mode.

A computing device may communicate over a network via an access point while limiting a total amount of power expended during operation of one or more other computing devices connected to the network. A computing device may incorporate an input/output (I/O) interface, a memory, and a controller coupled to the I/O interface and the memory. The controller may communicate over a network and receive, via the I/O interface and from one or more low power devices connected to the network, one or more details about the one or more lower power devices. Further, the controller may store, in the memory, the received one or more details about the one or more lower power devices and listen for a beacon from an access point of the network.

The controller of the computing device of may broadcast one or more details about the one or more low power devices to the access point. The one or more details may be broadcast by the controller in response to hearing the beacon from the access point.

The controller of the computing device may listen for a beacon from the access point. The controller may be listening for a beacon that incorporates a multicast packet of data for one or more low power devices for which the controller stores one or more details.

In response to hearing a beacon from the access point that incorporates a multicast packet of data for one or more low power devices for which the controller stores one or more details, the controller may broadcast one or more details of the one or more low power devices to which the multicast packet of data is to be delivered.

The controller of the computing device may send a unicast query to a low power device for which the controller is configured to store one or more details. In some cases, the unicast query may request updated details for the low power device.

The controller of the computing device may receive periodic state updates from a low power device for which the controller is configured to store one or more details.

The controller of the computing device may receive periodic state updates from a low power device for which the controller is configured to store one or more details without sending a request to the low power device.

The computing device may incorporate a power source. The power source may be connected to line power.

A system for communicating over a network via an access point may incorporate a first device connected to the network and in communication with an access point for the network, along with a second device connected to the network and in communication with the first device. The first device may store one or more details of the second device and may receive multicast packets of data broadcast over the network to a plurality of devices connected to the network. The plurality of devices incorporates the second device. Further, the first device may identify multicast packets of data broadcast over the network and directed to the second device.

The first device of the system may broadcast one or more stored details of the second device to the access point. In some cases, the first device may broadcast the one or more details in response to identifying a multicast packet of data as being directed to the second device.

The second device of the system may listen for unicast packets of data that are directed to the second device.

The first device of the system may translate the identified multicast packet of data into a unicast packet of data. Further, the first device may send the unicast packet of data to the second device.

The first device of the system may send a unicast query to the second device. In some cases, the unicast query may request updated details from the second device.

The first device of the system may repeatedly send the unicast query to the second device at a predetermined interval.

The first device of the system may receive periodic state updates from the second device. The periodic state updates may provide updates to the one or more details stored by the first device.

The first device of the system may receive the periodic state updates from the second device. In some cases, the first device may receive the periodic state updates without sending a request for an update to the second device.

The first device of the system may have a power source configured to connect to line power. The second device of the system may have a battery as a power source.

The second device of the system may be a thermostat.

An approach of interacting over a network may incorporate listening, with a first device, for a multicast packet of data directed to a second device of which the first device stores one or more details. The multicast packet of data may be sent by an access point for a network to which the first device and the second device are connected. The approach may incorporate identifying with the first device a multicast packet of data directed to the second device. The identified multicast packet of data may incorporate one or more of a query request for details of the second device and a control command for the second device. Further, the approach may incorporate responding to the identified multicast packet of data with one or more of a detail of the second device and a response to the control command.

In the approach, the first device may always listen for multicast packets of data for the second device while connected to the network.

A system for communicating over a network via an access point may incorporate a low power device connected to a first network and in communication with an access point for the first network, along with a remote server configured to communicate with the low power device over the first network via a second network. The remote server may store one or more details about the low power device and may receive one or more multicast packets of data broadcast over the first network to a plurality of devices connected to the network. The plurality of devices may incorporate the low power device. The remote server may identify multicast packets of data directed to the low power device.

The remote server of the system may broadcast one or more stored details of the low power device over the first network. In some cases, the remote server may broadcast the one or more details in response to identifying a multicast packet of data as being directed to the low power device.

The low power device of the system may listen for unicast packets of data that are directed to the low power device.

The remote server of the system may translate the identified multicast packet of data into a unicast packet of data. Further, the remote server may send the unicast packet of data to the low power device.

The remote server of the system may send a unicast query to the low power device. The unicast query may request updated details from the low power device.

The remote server of the system may repeatedly send the unicast query to the low power device at a predetermined interval.

The low power device of the system may send periodic state updates to the remote server. The periodic state updates may provide updates to the one or more details stored by the remote server.

The low power device of the system may send periodic state updates to the remote server. In some cases, the periodic state updates may be sent without the low power device receiving a request from the remote server for an update to the one or more stored details of the low power device.

The low power device of the system may have a battery as a power source.

The low power device of the system may be a thermostat.

A system for communicating over a network via an access point while limiting a total amount of power expended during operation of a low power device connected to the network may be noted. The system may incorporate an access point for a first network and a remote server connected to the first network over a second network. The remote server may store one or more details of a low power device connected to the first network. The access point may configured send all multicast packets of data directed at the low power device to the remote server. The remote server may respond to multicast packets of data directed at the low power device by sending one or more details of the low power device to the access point.

The remote server of the system may translate received multicast packets of data directed at the low power device into unicast packets of data for the low power device.

The system may incorporate a low power device in communication with the access point over the first network. The low power device may periodically listen for beacons of unicast packets of data directed at the low power device.

An approach of interacting over a network may incorporate listening, with a remote server, for a multicast packet of data directed to a low power device of which the remote server stores one or more details. The multicast packet of data may be sent by an access point for a first network and the remote server may be in communication with the access point over a second network. The approach may further incorporate identifying, with the remote server, a multicast packet of data directed to the low power device. The approach may further incorporate responding, from the remote server, to the identified multicast packet of data with one or more details of the low power device.

In the approach, the remote server may listen for multicast packets of data for the low power device while the low power device is connected to the first network.

In the approach, the identified multicast packet of data directed to the low power device may incorporate a query from a control device in communication with the first network. The query may request address details of all devices connected to the first network. The remote server may respond to the query with one or more address details of the low power device.

In the approach, the identified multicast packet of data directed to the low power device may incorporate a query from a control device in communication with the first network. The query may request details of services provided by virtually all devices connected to the first network. The remote server may respond to the query with one or more details concerning services provided by the low power device.

In the approach, the low power device may be a thermostat.

In the approach, the identified multicast packet of data directed to the low power device may incorporate a query from a new device in communication with the first network. The query may request name details of all devices connected to the first network to prevent name duplication on the first network. The remote server may respond to the query with a name of the low power device.

The approach may further incorporate receiving, at the remote server, an update of one or more details of the low power device. The received update may be unsolicited by the remote server.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to incorporate all such variations and modifications.

What is claimed is:

1. A system for communicating over a network via an access point, the system comprising:
 a first device connected to a network and in communication with an access point for the network; and a second device connected to the network and in communication with the first device,
  wherein the second device is a building automation device, wherein a building automation device comprises one or more of: a camera, a carbon monoxide detector, a smoke detector, a light bulb, a building automation sensor and a heating, air conditioning and ventilation (HVAC) controller device, and
  wherein the second device is configured to automatically enter and exit a power saving state and, while in the power saving state, not communicate with the first device or the access point; and
wherein:
the first device is configured to:
  store one or more details of the second device,
  receive periodic state updates from the second device without sending a request for an update to the second device,
  update the one or more details based on the periodic updates,
  receive multicast packets of data on the network to a plurality of devices connected to the network, wherein the plurality of devices comprises the second device, and
  identify multicast packets of data on the network that are directed to the second device.

2. The system of claim 1, wherein the first device is configured to broadcast one or more stored details of the second device to the access point in response to identifying a multicast packet of data as being directed to the second device.

3. The system of claim 1, wherein:
the second device is configured to listen for unicast packets of data that are directed to the second device; and
the first device is configured to translate the identified multicast packet of data into a unicast packet of data and send the unicast packet of data to the second device.

4. The system of claim 1, wherein:
the second device is configured to listen for unicast packets of data that are directed to the second device;
the first device is configured to send a unicast query to the second device, wherein the unicast query is configured to request updated details from the second device; and
the first device is configured to repeatedly send the unicast query to the second device at a predetermined interval.

5. The system of claim 1, wherein:
the first device has a power source configured to connect to line power and the second device has a battery as a power source.

6. A method of interacting over a network, the method comprising:
  listening, with a first device, for a multicast packet of data directed to a second device
    wherein the second device is a building automation device, wherein a building automation device comprises one or more of: a camera, a carbon monoxide detector, a smoke detector, a light bulb, a building automation sensor and a heating, air conditioning and ventilation (HVAC) controller device, and
    wherein the multicast packet of data is sent by an access point for a network to which the first device and the second device are connected;
  storing, by the first device, one or more details of the second device;
  automatically entering and exiting, by the second device, a power saving state, wherein while in the power saving state the second device does not communicate with the first device or the access point;
  identifying with the first device the multicast packet of data directed to the second device, wherein the identified multicast packet of data incorporates one or more of a query request for the details of the second device and a control command for the second device; and
  responding to the identified multicast packet of data with one or more of the details of the second device and a response to the control command.

7. The method of claim 6, wherein the first device is configured to always listen for multicast packets of data for the second device while connected to the network.

8. The method of claim 6,
wherein the second device is configured to listen for unicast packets of data that are directed to the second device,
the method further comprising, translating, by the first device the identified multicast packet of data directed to the second device into a unicast packet of data; and
sending, by the first device, the unicast packet of data to the second device.

9. The method of claim 8, further comprising, sending, by the first device, a unicast query to the second device,
  wherein the unicast query is configured to request updated details from the second device; and
  the first device is configured to repeatedly send the unicast query to the second device at a predetermined interval.

10. The method of claim 6, wherein the first device has a power source configured to connect to line power and the second device has a battery as a power source.

* * * * *